(12) United States Patent
Takada et al.

(10) Patent No.: US 6,256,068 B1
(45) Date of Patent: Jul. 3, 2001

(54) IMAGE DATA FORMAT CONVERSION APPARATUS

(75) Inventors: Shuichi Takada, Osakashi; Toshiyuki Kajimura, Narashi, both of (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 08/852,351

(22) Filed: May 7, 1997

(30) Foreign Application Priority Data

May 8, 1996 (JP) .................................................. 8-113372

(51) Int. Cl.[7] ...................................................... H04N 7/01

(52) U.S. Cl. ........................ 348/441; 348/445; 348/910; 348/458; 348/556; 386/131; 345/154

(58) Field of Search ................................. 348/441, 445, 348/447, 446, 454, 448, 458, 910, 555, 556; 386/131; 345/154, 153; H04N 7/01

(56) References Cited

U.S. PATENT DOCUMENTS

| | | | |
|---|---|---|---|
| 4,722,046 | 1/1988 | Kasrazadeh et al. | 386/200 |
| 4,875,173 | 10/1989 | Nakajima | 364/518 |

(List continued on next page.)

FOREIGN PATENT DOCUMENTS

| | | |
|---|---|---|
| 0 572 766 A2 | 12/1993 | (EP) . |
| 0 588 499 A2 | 3/1994 | (EP) . |
| 0 610 829 A1 | 8/1994 | (EP) . |
| 0 630 154 A2 | 12/1994 | (EP) . |

Primary Examiner—Reinhard J. Eisenzopf
Assistant Examiner—Jean W. Désir
(74) Attorney, Agent, or Firm—Parkhurst & Wendel, L.L.P.

(57) ABSTRACT

An image data format conversion apparatus comprises: a memory storing image data; a data reading means reading image data from the memory to output it; a format converting means converting the image data output from the data reading means to a predetermined format to output it or making the image data pass through without converting it; a vertical filter vertically interpolating the image data output from the format converting means by filtering operation to output the data or making the image data pass through without interpolating it; a horizontal filter vertically interpolating the image data output from the vertical filter by filtering operation to output the data or making the image data pass through without interpolating it; an image synthesizing means performing logic operation for image data output from the filter, and synthesizing the image data to output it; and an image output means outputting the image data from the image synthesizing means to a designated display unit.

In this image data format conversion apparatus, as a memory for storing groups of image data with different formats (attributes) is provided, and after making uniform the format of the image data output from the memory, interpolating processing is performed using the vertical and horizontal filters to reduce flickers Furthermore, since image reducing/expanding processing is performed utilizing the interpolating processing to make pixel ratios uniform and then operations are performed for plural series of image data to synthesize plural series of images with a same ratio in the image synthesizing means, it is possible to implement filters and buffers necessary to make uniform formats when plural series of original images having different formats are superposed and displayed, making use of filters and buffers used for flicker reducing processing, and thus hardware cost can be minimized.

In addition, in the image data format conversion apparatus, the image data obtained by synthesization in the image synthesizing means is not output directly to the display, instead the data is once written into the memory to be synthesized with the other original image. Therefore, it is not necessary to consider a correspondence between a production rate of moving picture data and a display rate of the display unit, whereby system configuration is facilitated.

12 Claims, 15 Drawing Sheets

U.S. PATENT DOCUMENTS

| | | | |
|---|---|---|---|
| 5,428,456 | | 6/1995 | Parulski et al. ...................... 358/340 |
| 5,493,413 | * | 2/1996 | Rhodes ................................ 386/131 |
| 5,502,837 | | 3/1996 | Hoffert ................................ 395/550 |
| 5,534,934 | * | 7/1996 | Katsumata et al. .................. 348/445 |
| 5,555,097 | * | 9/1996 | Joung et al. ......................... 386/123 |
| 5,561,467 | * | 10/1996 | Takeuchi et al. .................... 348/427 |
| 5,587,742 | | 12/1996 | Hau et al. ............................ 348/441 |
| 5,640,161 | * | 6/1997 | Johnson et al. ...................... 341/122 |
| 5,642,165 | * | 6/1997 | Suzuki et al. ........................ 348/404 |
| 5,748,243 | * | 5/1998 | Suzuki ................................. 348/405 |
| 5,771,073 | * | 6/1998 | Lim ..................................... 348/390 |
| 5,796,437 | * | 8/1998 | Muraji et al. ........................ 348/452 |
| 5,801,780 | * | 9/1998 | Schaumont et al. ................. 348/441 |
| 5,818,537 | * | 10/1998 | Enokida et al. ..................... 348/441 |
| 5,835,151 | * | 11/1998 | Sun et al. ............................. 348/441 |
| 5,838,381 | * | 11/1998 | Kasahara et al. .................... 348/441 |
| 5,872,531 | * | 2/1999 | Johnson et al. ...................... 341/110 |
| 5,896,122 | * | 4/1999 | MacDonald et al. ................ 345/153 |

* cited by examiner $$\begin{pmatrix} Y \\ U \\ V \end{pmatrix} = \begin{pmatrix} m11 & m12 & m13 \\ m21 & m22 & m23 \\ m31 & m32 & m33 \end{pmatrix} \begin{pmatrix} R \\ G \\ B \end{pmatrix}$$

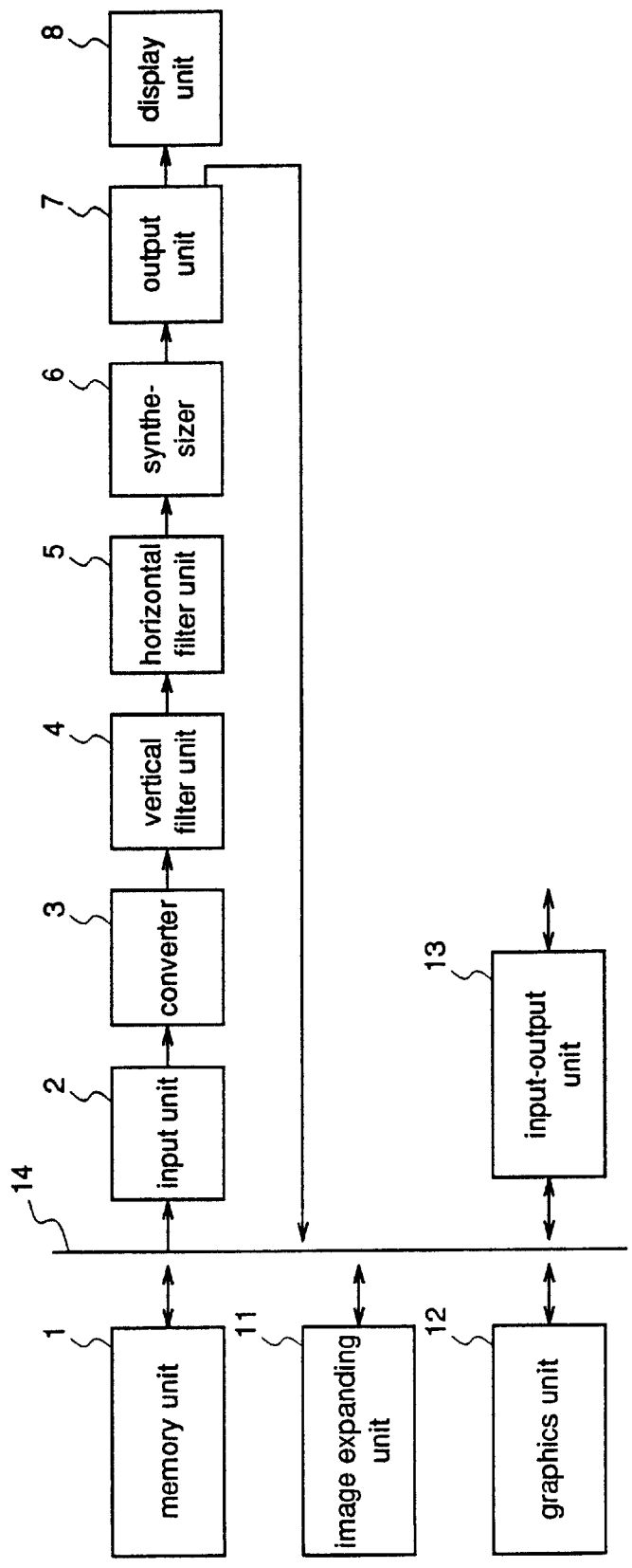

IMAGE DATA FORMAT CONVERSION APPARATUS

FIELD OF THE INVENTION

The present invention relates to an image data format conversion apparatus, and in particular, to an image data format conversion apparatus which changes formats (attributes) when displaying graphics images and moving pictures used for computers, digital AV apparatuses, and cable television or the like.

BACKGROUND OF THE INVENTION

An example of a prior art image data format conversion apparatus is described in Japanese Published Patent Application No. Hei. 8-242427 which has been filed by the applicant of the present invention. Hereinafter the image data format conversion apparatus will be described using FIG. 13.

In FIG. 13, reference numeral 101 designates a display control unit outputting image data (R, G, B), numeral 3 designates a converter receiving the image data (R, G, B) and converting the data into signals in YUV format, numeral 4 designates a vertical filter unit, numeral 5 designates a horizontal filter unit, numeral 8 designates a display unit synthesizing the respective outputs from the vertical filter unit 4 and the horizontal filter unit 5, numeral 401 designates a first vertical filter buffer storing a line of data output from the converter 3, numeral 402 designates a second vertical filter buffer storing a line of data output from the first vertical filter buffer 401.

The display control device 101 horizontally scans the image data (RGB) stored in an image memory in accordance with a display rate of the display unit 8 to output the data. However, since an RGB-only monitor is required as a display unit 8, the image data is converted from the RGB format to the YUV format employed for television by the converter 3.

When image data processing is performed in RGB format, the three elements, i.e., red, green, and blue, have to be subjected to the same processing. On the other hand, in the case of YUV format, it is possible to process only luminance Y among three elements of luminance Y, color-difference U, color-difference V, or the data process can be carried out by sampling the color-difference U and the color-difference V, utilizing a visual characteristic unique to human beings of being dull at changes of color information. This format allows a reduction in cost of a hardware to be integrated.

Next, in order to reduce flickers caused by interlace display specific to television, the vertical filter unit 4 cuts off high frequency components using a low-pass filter to reduce a difference in brightness between adjacent lines. Flickers are attributed to a characteristic unique to human beings that blinks of dark light are perceived at 30 Hz and blinks of bright light are perceived at 60 Hz or less. When an image having a large difference in brightness between adjacent lines, such as a computer graphic, is displayed on an interlace display unit, as interlace scanning is performed in the interlace display unit, light flashes on and off at 30 Hz on the display unit and the blinks are perceived as flickers.

Therefore, as the vertical filter unit 4 has three taps, that is, the filter unit 4 uses a low-pass filter for three dots of image data (three pixels) aligned in the vertical direction, three lines of data aligned in the horizontal direction are required. The first vertical filter buffer 401 and the second vertical filter buffer 402 store two lines of data aligned in the horizontal direction. The two lines of data and a next line of data are process targets for the vertical filter unit 4. Since the next line of data is input to the first vertical filter buffer 401 as soon as the data in the first vertical filter buffer 401 is transmitted to the second vertical filter buffer 402, the latest line data is always reserved. As described above, the low-pass filter is used for three dots of image data aligned vertically and each shifted from adjacent dots by one line. This prior art reduces hardware cost by filtering the luminance component Y only among the elements YUV.

While using a low-pass filter for the vertical direction, the horizontal filter unit 5 uses a low-pass filter for the horizontal direction. As a display unit like a TV has insufficient resolution of color information of adjacent pixels, inconsistency in color occurs when displaying an image of higher resolution on such display unit. Therefore, among the elements YUV, only the color-difference components U and V are horizontally filtered. In this case, unlike the case of the vertical filtering, as the horizontally-scanned data alone is processed, buffers such as the vertical buffers 401 and 402 are unnecessary.

Finally, the luminance component Y output from the vertical filter unit 4 and the color-difference components U and V output from the horizontal filter unit 5 are output together to the display unit 8, whereby conversion to a clear image with no flicker is realized.

Thus, the above configuration can implement an image data converting function which fits to characteristics of a display unit.

The prior art image data format conversion apparatus has the above-described configuration and can perform overlay of one image on another as long as the images have the same pixel ratio. However, it is impossible for the above configuration to perform overlay of images with different pixel ratios, for example, Video Graphics Array (VGA) image and Moving Pictures Experts Group (MPEG) image. Moreover, when reducing/expanding an original image to an arbitrary size to adapt the image to a pixel ratio of a screen on a display unit, another filter and buffer for image interpolating are required, causing problems such as high hardware cost.

SUMMARY OF THE INVENTION

It is an object of the present invention to provide an image data format conversion apparatus processing a plurality of images at the same time and superposing the images, and capable of distributing the images to plural output targets and reducing flickers and reducing/expanding images to an arbitrary size at one time using only horizontal and vertical filters, thereby minimizing hardware cost.

Other objects and advantages of the present invention will become apparent from the detailed description given hereinafter; it should be understood, however, that the detailed description and specific embodiment are given by way of illustration only, since various changes and modifications within the scope of the invention will become apparent to those skilled in the art from this detailed description.

An image data format conversion apparatus according to the present invention comprises: a memory storing image data; a data reading means reading the image data from the memory to output the data; a format converting means converting the image data output from the data reading means to a predetermined format to output the data or making the image data output from the data reading means pass through without converting the data; vertical and horizontal filters vertically and horizontally interpolating the image data output from the converting means by filtering operation to output the data, respectively, or making the image data output from the format converting means pass through without interpolating the data; an image synthesizing means performing logic operations for the image data output from the vertical and horizontal filters and synthesizing the image data to output the data; and an image output means outputting the image data from the image synthesizing means to a designated display unit.

In this image data format conversion apparatus, since a memory unit for storing plural series of image data having different formats (attributes) is provided, and after making uniform the format of the image data output from the memory, interpolating processing is performed using vertical and horizontal filters to reduce flickers. Furthermore, as image reducing/expanding processsing is performed utilizing the interpolating processing to make pixel ratios uniform and then operations are performed for plural series of image to synthesize plural series of images with a same ratio in the image synthesizing means, it is possible to implement filters and buffers necessary to make formats uniform when plural series of original images having different formats are superposed and displayed, making use of filters and buffers used for the flicker reducing processing, and thus hardware cost can be minimized.

In addition, in the image data format conversion apparatus, the image data obtained by synthesization in the image synthesizing means is not output directly to the display unit, instead the data is once written into the memory unit to be synthesized with the other original image. Therefore, it is not necessary to consider a correspondence between a production rate of moving picture data and a display rate of the display unit, whereby system configuration is facilitated.

BRIEF DESCRIPTION OF THE DRAWINGS

FIG. 16 is a block diagram illustrating an image data format conversion apparatus according to the first embodiment having a structure that an output of an output unit is written into a memory unit.

DETAILED DESCRIPTION OF THE PREFERRED EMBODIMENTS

Hereinafter a description is given of preferred embodiments of the present invention with FIGS. 1 to 11.
Embodiment 1

Figure 1:
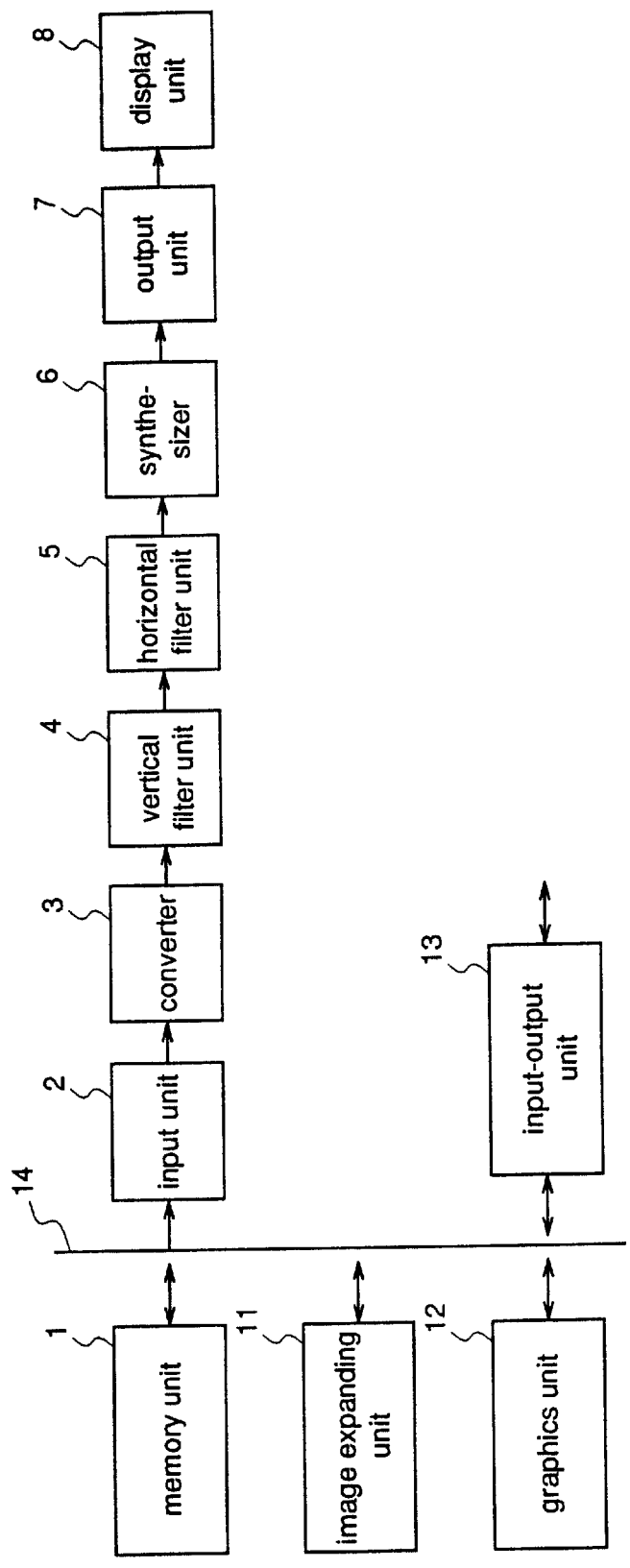
FIG. 1 is a block diagram illustrating a configuration of an image data format conversion apparatus according to a first embodiment of the present invention.
Figure 2:
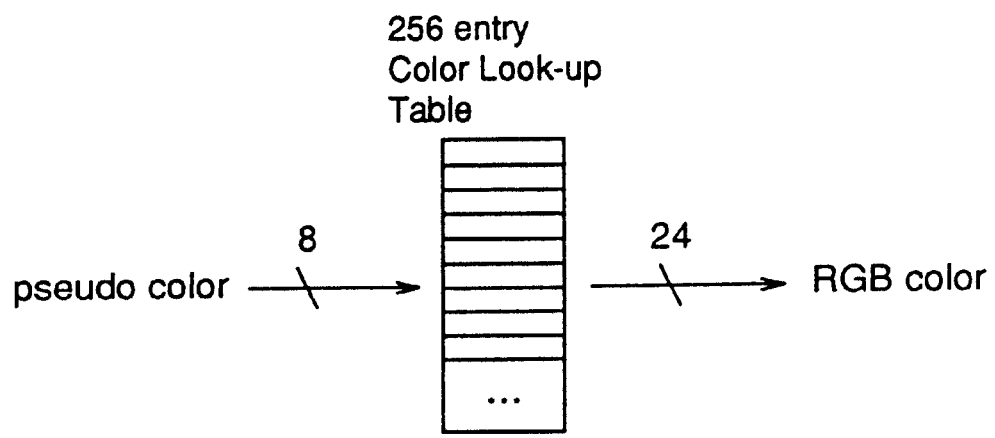
FIGS. 2(*a*) and 2(*b*) are diagrams for explaining converting operation of a format converter in an image data format conversion apparatus according to the first embodiment.

FIG. 1 is a block diagram of an image data format conversion apparatus according to a first embodiment. In FIG. 1, reference numeral 1 designates a memory unit capable of storing plural series of image data, numeral 2 designates an input unit reading the image data from the memory unit to output the data to a unit in a next stage, numeral 3 designates a converter converting the input image data to the data in a predetermined format, and the converter 3 is designed to convert the image data to YUV format when the data is not the one in YUV format. Reference numeral 4 designates a vertical filter numeral 5 designates a horizontal filter, numeral 6 designates a synthesizer synthesizing the output signals from the horizontal filter unit 5, numeral 7 designates an output unit outputting the image data from the synthesizer 6 in accordance with a display timing of a display unit in a next stage, numeral 11 designates an image expanding unit forming and outputting, for example, moving pictures such as MPEG images, numeral 12 designates a graphics unit producing images such as VGA images, and numeral 13 designates an input-output unit connected to a memory bus 14.

The display unit 8 is implemented by a display with a low display rate which allows occurrence of flicker, that is, a display where a dark light flashes on and off at 30 Hz or less and a bright light flashes on and off at 60 Hz or less.

Next, the operation will be described. In the memory unit 1 stored are the data of moving picture (MPEG images, for example) generated by the image expanding unit 11 and the bitmap data (VGA images, for example) generated by the graphics unit 12. The regions in which the respective series of data are accumulated act as frame memories (each region is hereinafter referred to as a frame memory) through the memory bus 14, and the accumulated data are treated as the data stored in the frame memories.

When two series of image data with different image attributes (pixel ratio and format in this case) are present in the frame memories of the memory unit 1, the input unit 2 reads the data alternatingly from the respective frame memories, and outputs the data to the converter 3. The converter 3 detects the format of the transmitted image data, and converts the data format to the YUV format when the data is not in the YUV format. If the format of the transmitted data is the YUV format, the conversion is not performed. For example, when an image attribute of a frame memory is 8-bit pseudo color per pixel, 24-bit RGB color is obtained from the 8-bit data by referencing a 256 entry color LUT (look-up table) as shown in FIG. 2(a), and then the RGB format is converted to the YUV format by matrix arithmetic shown in FIG. 2(b). In FIG. 2(a), the contents of the LUT can be set in advance by user and when the pixel value in a frame memory is 0, display of color purple is realized by writing an RGB value for color purple into the 0 address of the LUT. In FIG. 2(b), m11 to m33 are values specific to a format relating to conversion and vary according to a format which is input.

The vertical filter unit 4 not only interpolates the image data output from the converter 3 using a low-pass filter to infer an arbitrary sample point but performs flicker reducing processing. At first, the interpolating operation of the vertical filter unit 4 will be described with reference to FIGS. 3(a) to 3(e). FIG. 3(a) illustrates sample lines of the image data output from the converter 3 and in the figure, the abscissa represents pixel positions in the vertical direction and the ordinate represents data value.

Figure 3:
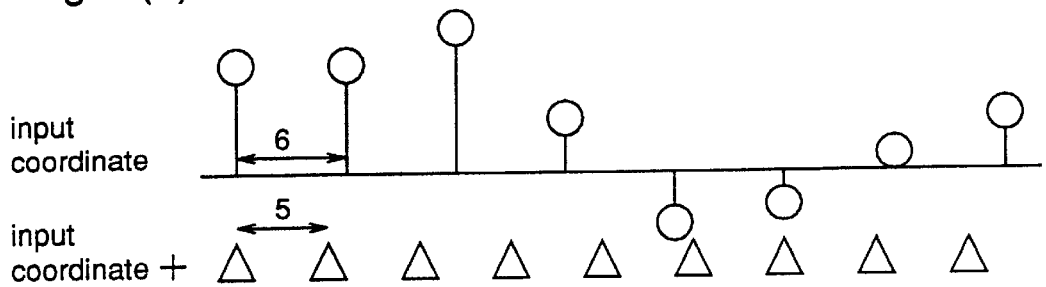
FIGS. 3(*a*) to 3(*e*) are diagrams for explaining interpolation methods using interpolation filters.
Figure 3:
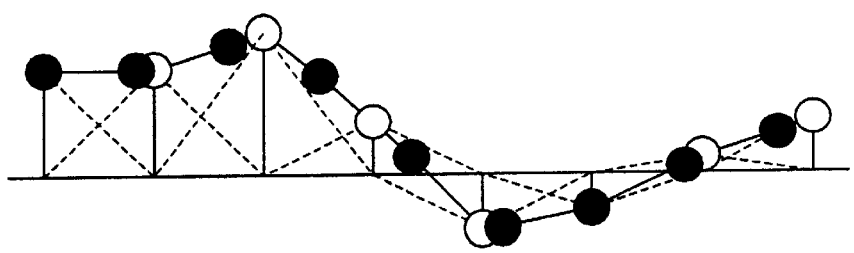
Figure 3:
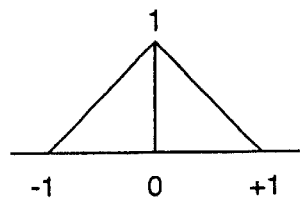
Figure 3:
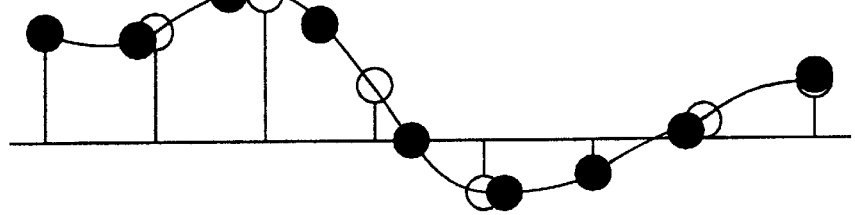
Figure 3:
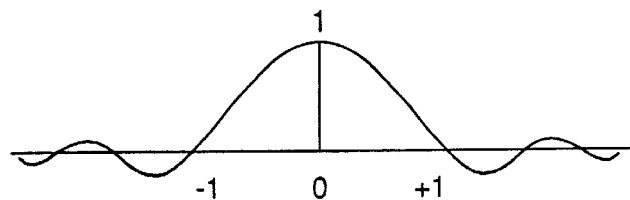
Figure 4:
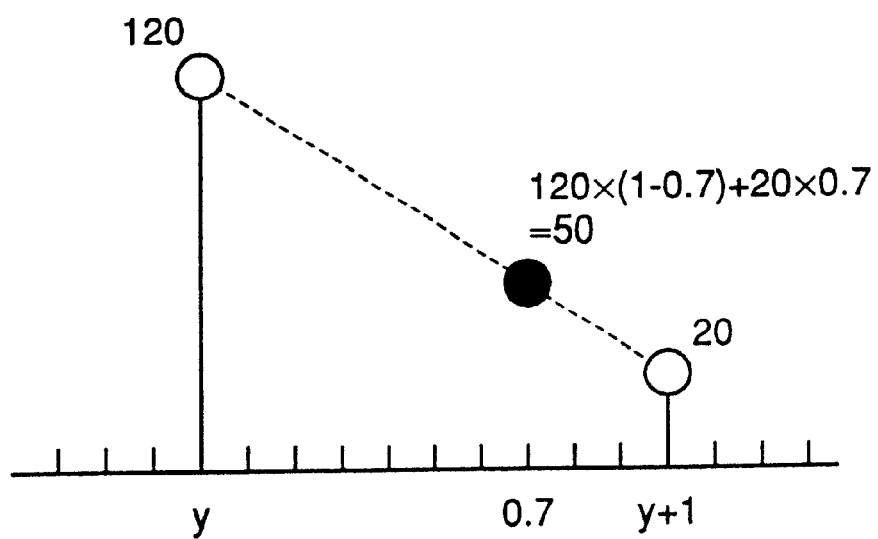
FIG. 4 is a diagram for explaining linear interpolation which is one of the interpolation methods.

Although the elements of the image data, Y, U, V are subjected to the interpolating processing, the figure illustrates the data of one of the elements by open circles for brief explanation. For example, in the case of vertically expanding an image of 400 pixels to an image of 480 pixels, when the data is resampled with a certain sampling interval so that a ratio between the sampling interval of the data and that of the original data is 5:6, the sampling number is increased to a value 6/5 times as large as the original sampling number, resulting in an increase in the number of pixels as represented by black dots. FIG. 3(b) illustrates interpolating between adjacent sample data shown in FIG. 3(a) using straight lines. As the linear interpolation treats only adjacent sample data, the interpolating processing is equal to extracting a sample value of an arbitrary point after performing convolution using a two-tap filter shown in FIG. 3(c). If a distance between an original sample point and an arbitrary sample point is obtained, the operation of extracting a sample value of an arbitrary point can be carried out with ease by using the distance, as shown in FIG. 4. FIG. 4 illustrates inferring a sample point (y+0.7) positioned between a sample point y and a sample point (y+1). When a value of the sample point y is 120 and a value of the sample point (y+1) is 20, a value of the desired sample point is found to be 50 by calculation using the distance between the sample points, which is 0.7.

Next, a description is given of the flicker reducing processing. In the above description, the vertical filter unit 4 is explained as the filter having the filter coefficient shown in FIG. 3(b). The filter with the filter coefficient shown in FIG. 3(b), however, is not capable of reducing flickers although it is capable of performing interpolation. Therefore, it is necessary to employ a filter having a filter coefficient shown in FIG. 10(b) for performing interpolation and flicker reducing processing at the same time. This will be described in detail in a third embodiment.

FIG. 3(d) illustrates interpolating distances between adjacent sample data shown in FIG. 3(a) using not straight lines but second order or higher-order curves. By seeing adjacent sample data by the number of the order of a curve which is used, this curve interpolation is equal to extracting a sample value of an arbitrary point after performing convolution with the high-order filter shown in FIG. 3(e). In the operation of extracting a sample value of an arbitrary point, it is necessary to infer the value of the filter from a distance between an original sample point and an arbitrary sample point. This inferring requires more complex calculation with increase in the order of the used curve although the higher order enables interpolation with higher accuracy, and therefore the inferring is not realistic. Accordingly, a value of a filter is inferred by an approximate value. Detailed description on the inferring will be given in a third embodiment.

Since, in the memory unit 1, each image data is stored successively in the horizontal direction with respect to memory address, high-speed access is possible by burst reading when horizontal reading is performed by the input unit 2, but when vertical reading is performed, burst reading cannot be performed. Therefore, when the memory bus 14 is utilized by a lot of units, reading the data successively and horizontally is essential so as not to exceed the limitation of the access To the memory bus 14. Hence, the vertical filter unit 4 requires sample data in the vertical direction for interpolating processing, and the filter unit 4 requires a configuration capable of storing the data which are read horizontally, like the vertical buffers 401 and 402 described in the prior art.

The horizontal filter unit 5 performs interpolation and infers arbitrary sample points for the image data output by the vertical filter unit 4 employing a low-pass filter. This operation is equal to the operation of the vertical filter unit 4. However, as the horizontal filter unit 5 requires no data other than the horizontal sample data, it is not necessary for the filter unit 5 to store the horizontally read data like the vertical filter unit 4. It only requires successive processing to the input data.

Although in this description it is assumed that each image data is stored in the memory unit 1 successively in the horizontal direction with respect to memory address, the image data can be stored successively in the vertical direction by only exchanging the vertical and horizontal filters. To be more specific, the vertical filter unit 4 requires no buffer while the horizontal filter unit 5 only requires a buffer.

The synthesizer 6 performs logical operation to the two series of image data with uniform attributes which are alternatingly output from the horizontal filter unit 5. The operations include, for example, synthesizing bitmap data formed by the graphics unit 12 on the moving picture data produced by the image expanding unit 11 with a ratio of M:N (M, N:integers), or synthesizing those with a ratio obtained by referring to the information added to pixel data.

The output unit 7 outputs the image data output by the synthesizer 6 in accordance with the display timing of the display unit 8. When there are a lot of display units 8, the image data may be detected for their attributes and output to the display unit 8 which is designated corresponding to the detected attribute.

As shown in FIG. 16, image data with a new attribute can be formed by writing the output of the output unit 7 into the memory unit 1, or the data can be transmitted by way of a network from the input-output unit 13 through the memory bus 14. In particular, formation of a new frame memory region in the memory unit 1 allows reprocessing the image data, which is very useful. For example, this enables that the moving picture data formed by the image expanding unit 11 is reduced or expanded through a serie of operations and the reduced/expanded data is written into the memory unit 1, and that the read out reduced/expanded data is converted into another format through the same operations to be output to the display unit 8.

Figure 5:
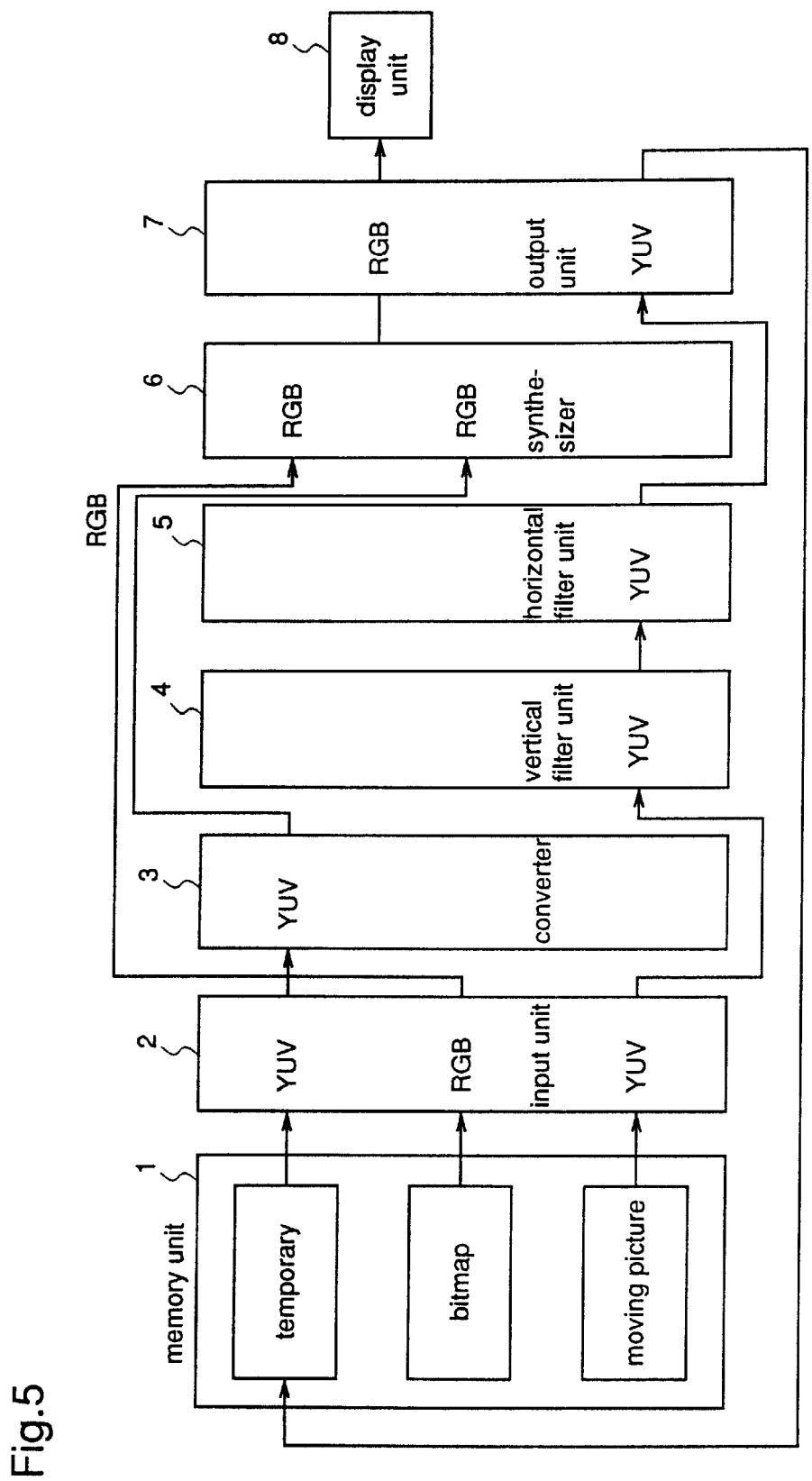
FIG. 5 is a diagram for explaining a flow of data in an image data format conversion apparatus according to the first embodiment having a configuration that an output of an output unit is written into a memory unit.

FIG. 5 shows an example of the image data reprocessing. In the example, a converter 3 that is capable of converting the input image data into the YUV format as well as into the RGB format is employed, and the system is designed to finally output the image data in the RGB format. As a display unit 8, a display with a high display rate which causes flicker is employed, and filters having a filter coefficient which are capable of performing interpolation but not capable of performing flicker reducing processing, as shown in FIG. 3(*b*), are employed as a vertical filter unit 4 and a horizontal filter unit 5.

The moving picture data (YUV) stored in the memory unit 1 passes through the input unit 2, and is reduced or expanded by the vertical filter unit 4 and the horizontal filter unit 5 after bypassing the converter 3. After bypassing the synthesizer 6, the reduced/expanded data is written into the memory unit 1 as temporary data. Next, the temporary data passes through the input unit 2 and is converted from the YUV format to the RGB format. The converted data is input to the synthesizer 6 after bypassing the vertical filter unit 4 and the horizontal filter unit 5.

On the other hand, the bitmap data passes through the input unit 2, and is input to the synthesizer 6 after bypassing the converter 3, the vertical filter unit 4, and the horizontal filter unit 5. In the synthesizer 6, the bitmap data is synthesized with the temporary data in the RGB format which has been input to the synthesizer 6 to be output to the display unit 8. At this time, inputting and outputting of the temporary data and the bitmap data to or from the respective units are controlled by the same display rate while the moving picture data is controlled at the display rate other than the display rate for these data. Therefore, the display rate does not depend on the moving picture forming rate of the image expanding unit 11 is not dependent on the display rate, and thus the system can be configured with ease without considering the display rates of the image expanding unit 11 and the display unit 8. The final output format of the image data obtained in such a manner as described above is the RGB format, and therefore an application of the system to usage such as attaching a moving picture on a display of a personal computer is possible. Furthermore, since the converter 3, the vertical filter unit 4, the horizontal filter unit 5, and the synthesizer 6 are used no more than once, it is possible to minimize hardware cost.

The above-described configuration enables to reduce/expand and synthesize various images with minimum hardware cost.

As described above, in the first embodiment, a memory unit 1 is provided for storing plural series of image data with different pixel ratios and different formats (attributes) and, after making uniform the format of the image data output from the aforesaid memory unit 1 by the converter 3, interpolating processing is performed using the vertical filter unit 4 and the horizontal filter unit 5 to reduce flickers, and image reducing/expanding processing is carried out utilizing the interpolating processing to make pixel ratios uniform, and in the synthesizer 6, operations are performed for the plural series of image data having a uniform attribute to eynthesize plural series of images with a same ratio. Therefore, it is possible to implement filters and buffers necessary to overlay and display original images having different attributes by using filters and buffers used for the flicker reducing processing, thereby minimizing hardware cost.

Furthermore, as the image data obtained by synthesization at the synthesizer 6 is not input to the display unit but written directly into the memory unit 1 to be synthesized with another original image, it is not necessary to consider a correspondence between the moving picture forming rate of the image expanding unit 11 and the display rate of the display unit 8, thereby facilitating system configuration.

Embodiment 2

Figure 6:
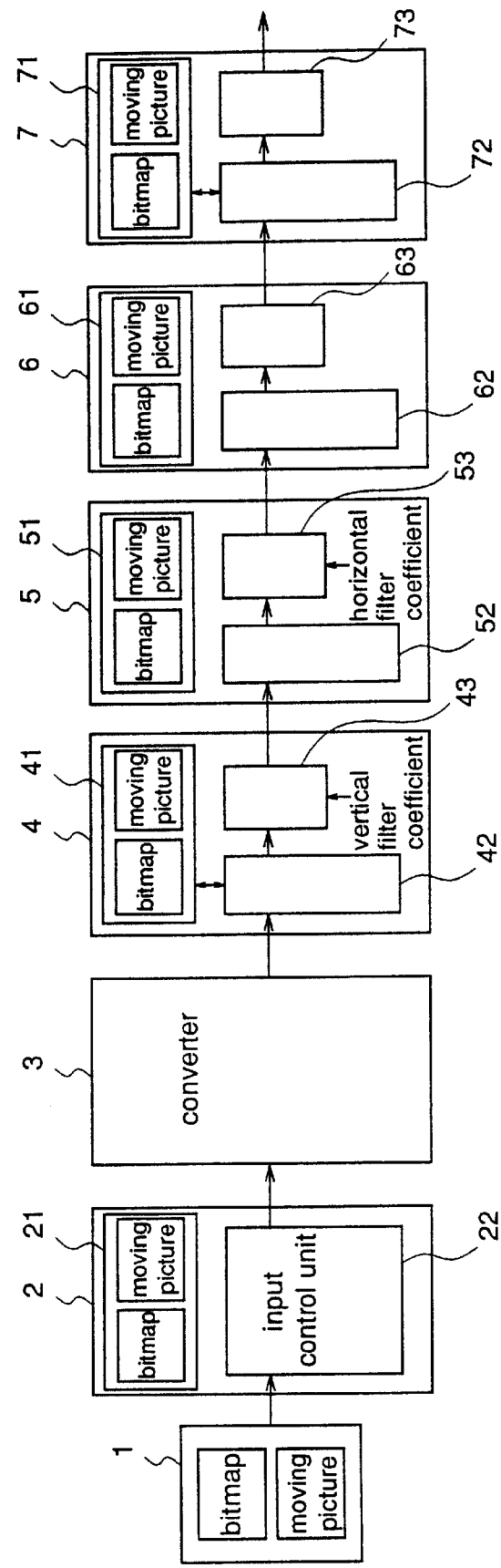
FIG. 6 is a block diagram illustrating a configuration of an image data format conversion apparatus according to a second embodiment of the present invention.

FIG. 6 is a block diagram of an image data format conversion apparatus according to a second embodiment of the present invention. In FIG. 6, the same reference numerals shown in FIG. 1 designate same or corresponding parts, and the regions of the memory unit 1 storing different series of image data, respectively, act as frame buffers (each region is hereinafter referred to as a frame buffer). An input buffer 21 is a place for temporarily storing contents of frame buffers in the memory unit 1, and the input buffer 21 also prepares a space for storing data which the vertical filter unit 4 requires after passing through the converter 3. To be more specific, this system allows a pipeline operation, in which, as soon as the data stored in the input buffer 21 is referred to by the vertical filter unit 4 after passing through the converter 3, the data in the memory unit 1 is read into the input buffer 21 by a required amount. The operation is controlled by the input control unit 22.

In order to utilize the burst access of the memory unit 1 effectively, the input buffer 21 having a buffer capacity of (burst access unit)×(frame buffer number stored in the memory unit 1)×(a tap number of the vertical filter unit 4−1) is basically provided, so as to correspond to plural images. For example, assuming that the burst access unit of the memory unit 1 is 8 bytes, the number of frame buffer is two, i.e., one for bitmapped image and one for moving picture, and the vertical filter unit 4 is a 3-tap filter and data of past two taps is required, a buffer of 8 bytes×2×2=32 bytes or more is prepared. Generally, a buffer with a capacity of 64 bytes, which is a double of 32 bytes, is prepared and the half thereof, 32 bytes, is processed by the pipeline operation, with the rest half capacity, 32 bytes, is replaced by the burst access, thereby preventing corruption of the pipeline operation. However, since the vertical filter unit 4 requires data aligned in the vertical direction by an amount corresponding to the tap number of the filter, if the vertical filter unit 4 does not have 2 lines of filter buffers like the prior art, the access number is triplicated corresponding to the tap number. Assuming that one line has 720 pixels and one pixel has 2 bytes in the filter buffer, two lines of filter buffers amount to a capacity of 2.88 kilobytes.

The vertical filter buffer 41 is a place for temporarily storing the output of the converter 3 and preparing required data for the vertical filter control unit 43 which performs vertical filtering. To be more specific, the unit allows a pipeline operation that as soon as the data stored in the vertical filter buffer 41 is referred to by the horizontal filter unit 5 at the subsequent stage after passing through the vertical filter control unit 43, the data in the converter 3 at the previous stage is read into the vertical filter buffer 41 by a required amount. The operation is controlled by the vertical filter distributor 42. Since the vertical filter buffer 41 is, unlike the input buffer 21, one for making a pipeline between the converter 3 and the horizontal filter unit 5, the buffer capacity of (the frame buffer number stored in the memory unit 1)×(a tap number of the vertical filter control unit 43−1) is basically prepared, so as to correspond to plural images. For example, assuming that the number of frame buffer is two, i.e., one for bitmapped image and one for moving picture, and the vertical filter control unit 43 is a 3-tap filter and data of past two taps are required, a buffer of 2×2=4 bytes or more is only to be prepared.

The horizontal filter buffer 51, the synthesization buffer 61, and the output buffer unit 71 respectively in the horizontal filter unit 5, the synthesizer 6, and the output unit 7, makes pipelines like the vertical filter buffer 41, and these units are controlled by the horizontal filter distributor 52, the synthesization distributor 62, and the output distributor 72, respectively. However, the capacity of each of these buffers is enough to be the number of the frame buffer because pipelines at subsequent stages can perform successive processing unlike the vertical filter control unit 43.

As described in the first embodiment, the horizontal filter control unit 53 performs horizontal filtering which is a main function of the horizontal filter unit 5 and the synthesization control unit 63 performs synthesization which is a main function of the synthesizer 6, and the output control unit 73 performs outputting which is a main function of the output unit 7.

The above-described configuration enables reducing/expanding and synthesizing plural images of different attributes like moving pictures and bitmapped images while sharing the images in the same pipelines.

Next, a description is given of an efficient control method for an image data format conversion apparatus with the above configuration according to the second embodiment.

Figure 7:
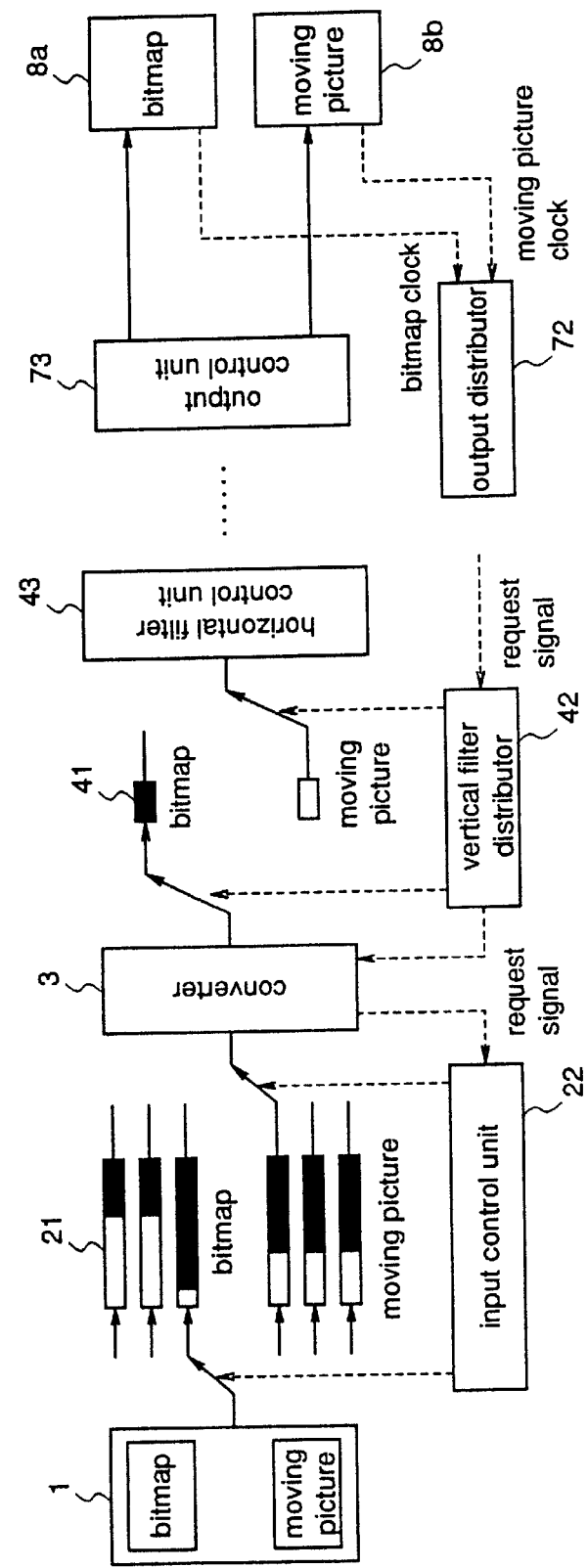
FIG. 7 is a diagram for explaining an operation of an image data format conversion apparatus according to the second embodiment.

FIG. 7 shows an example where the bitmap data and the moving picture data are displayed on different display units 8a and 8b. The bitmap data and the moving picture data stored in the memory unit 1 are respectively written into the buffers corresponding to the respective attributes of the data in the input buffer 21. In the writing, the state of effective data in the input buffer 21 is checked successively and, with making the buffer having the smallest amount of effective data as a target, the writing is executed if the capacity corresponding to an amount of data to be written by burst access into the memory unit 1 can be written in. Thereby, it is possible to fill in data evenly into the input buffer 21. The input control unit 22 also determines data of which attribute is to be output from the input buffer 21 on the basis of a request signal output designating the attribute of the data which is output from the converter 3, to output the same.

The request signal from the converter 3 is a signal transmitted from the vertical filter distributor 42. The vertical filter distributor 42 checks the state of each effective data in the vertical filter buffer 41 successively and chooses a signal with the attribute of the buffer having the smallest amount of effective data, as a request signal. Thereby, is possible to fill data evenly in the vertical filter buffer 41. At this time, the vertical filter distributor 42 also determines which kind of data is output from the vertical filter buffer 41 according to a request signal which designates an attribute of data, outputting the data. The horizontal filter unit 5, the synthesizer 6, and the output unit 7 perform buffer control in the same manner and transmit request signals to the distributors in their previous stages, each request signal having a data attribute of a frame buffer having the smallest amount of effective data in a buffer.

Figure 12:
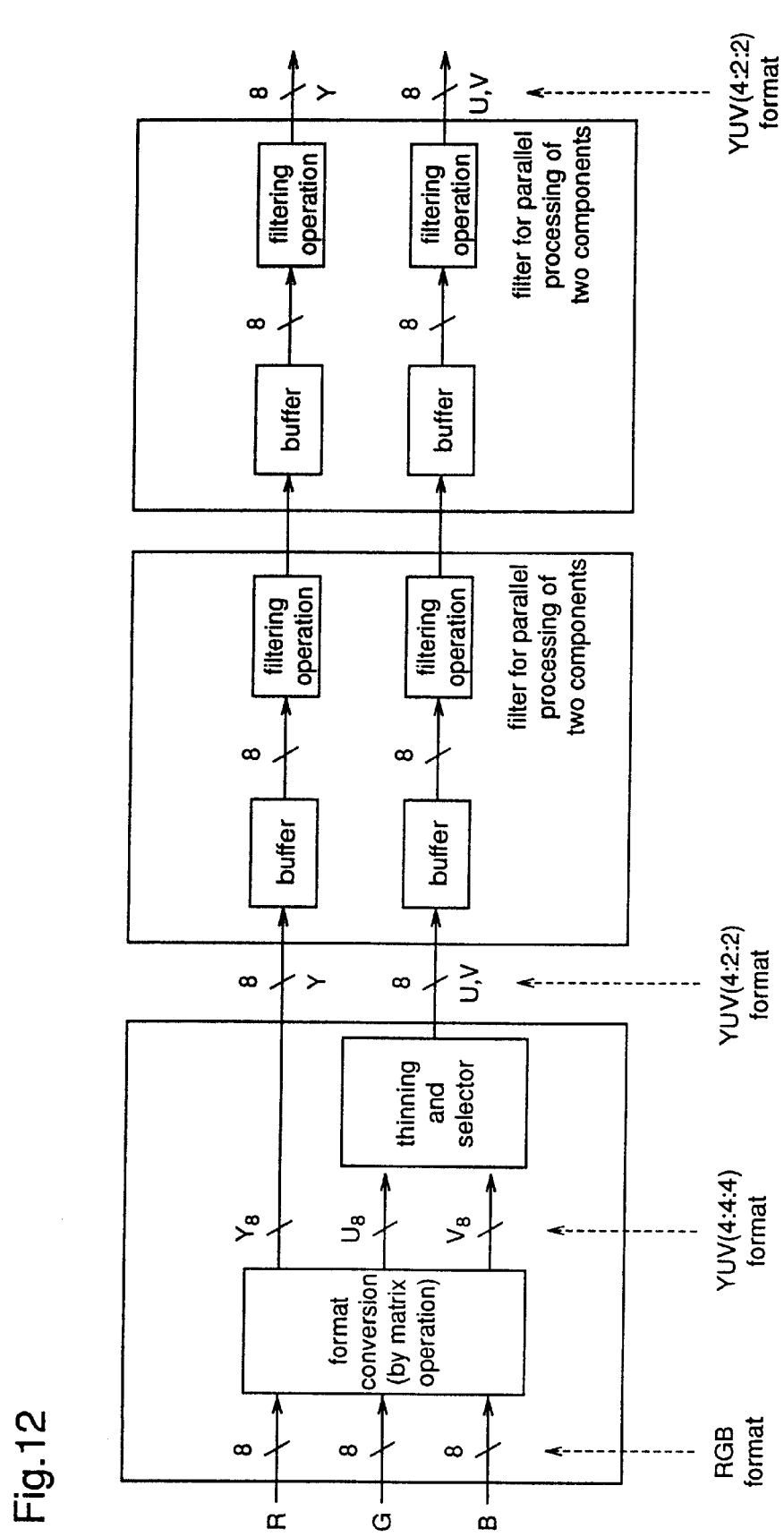
FIG. 12 is a diagram for explaining pipeline operation parallel-processing two components in an image data format conversion apparatus according to the second embodiment of the present invention.
Figure 13:
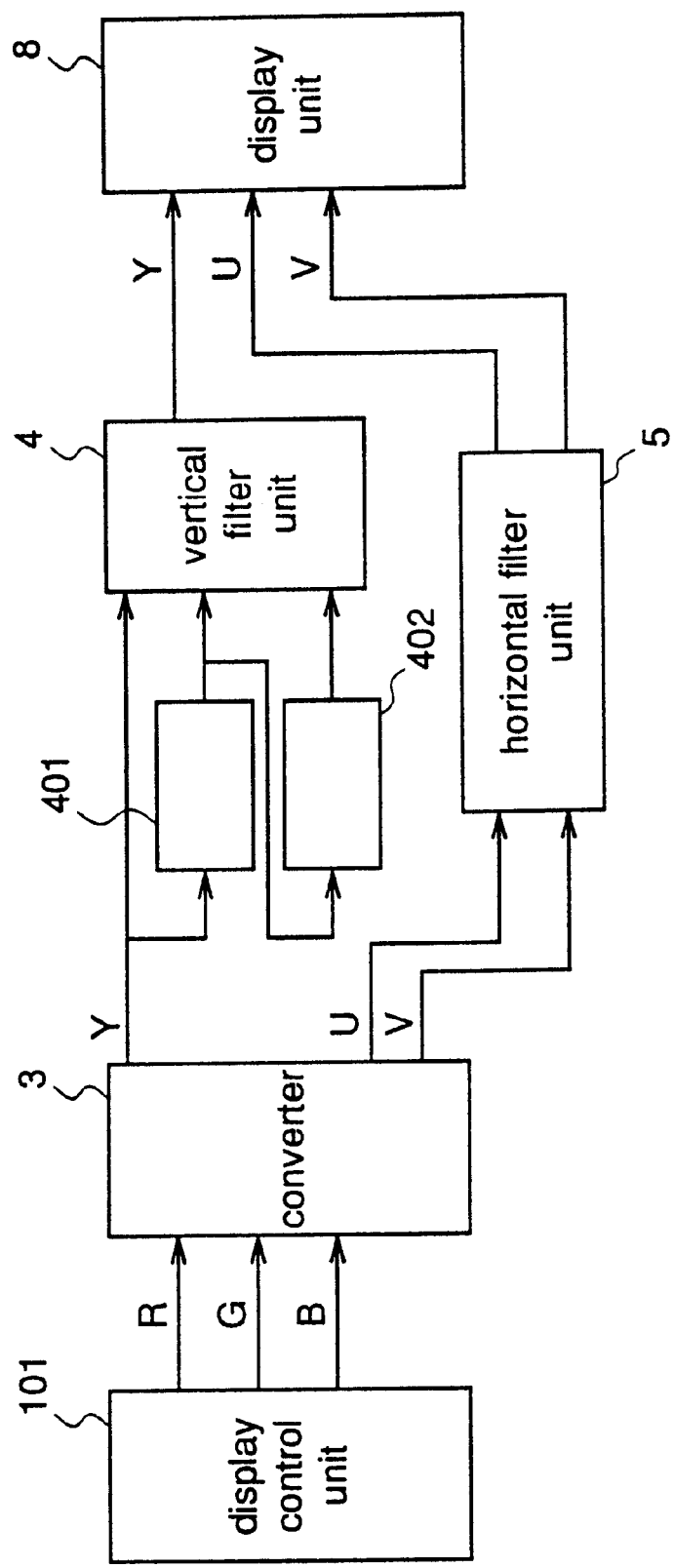
FIG. 13 is a block diagram illustrating a prior art image data format conversion apparatus.

The output distributor 72 of the output unit 7 in the final stage produces request signals to the output buffer unit 71 according to display clocks (bitmap clock and moving picture clock) from the display unit 8a for bitmap and the display unit 8b for moving picture. For example, assuming that the bitmap display clock is 20 MHz and the moving picture display clock is 10 MHz, two of every three request signals transmitted to the synthesizer 6 in the previous stage by the output distributor 72 are the signals requesting bitmap data, and one of every three request signals are the signals requesting moving picture data. The moving picture data is in the YUV format, especially the format called "4:2:2" in which the color-difference components U and V are reduced to half of the luminance component Y, and the components of this format have different display clocks. For speeding up, in general, pipelines capable of parallel-processing the three components of Y, U, and V are provided. In the second embodiment, however, as the components can be processed effectively by absorbing the differences between their clocks, pipelines capable of parallel-processing the two components can be used. This embodiment can be applied to the case where bitmap data and moving picture data are displayed at the same time using a television set instead of the display units 8a and 8b. In this case, a reduction in hardware cost is easily realized by converting the bitmap data to the YUV format and then reducing the color-difference components U and V to a half of the luminance component Y. FIG. 12 shows a system configuration in this case.

As shown in FIG. 7, in the case of displaying different series of image data on the display units 8a and 8b used for the corresponding image data only, respectively, it is not necessary to make uniform the image attributes (pixel ratio and format) between the different series of data. On the other hand, in the case of overlaying and displaying different series of image data on a single display unit, it is necessary to make uniform the image attributes between the different series of data in the same way performed in the first embodiment.

Furthermore, the vertical filter unit 4 and the horizontal filter unit 5 can reduce flickers when the display unit is the one which causes flickers.

As described above, in the second embodiment having the configuration of the first embodiment, buffer memories are provided in the input unit, the vertical and horizontal filter units, the synthesizer, and the output unit, respectively, and pipeline processing is performed in such a manner that data reading can be carried out in the respective buffer memories based on a ratio corresponding to values of display clocks for image data to be displayed. Therefore, moving picture and bitmapped images can be processed by time-sharing one pipeline processing path, thereby improving process efficiency. Furthermore, in processing images with different attributes by time-sharing, it is not necessary to perform flash (clear) process for buffers which is carried out when a data processing is changed to the one of different attribute, resulting in reduced processing time.

Embodiment 3

Figure 8:
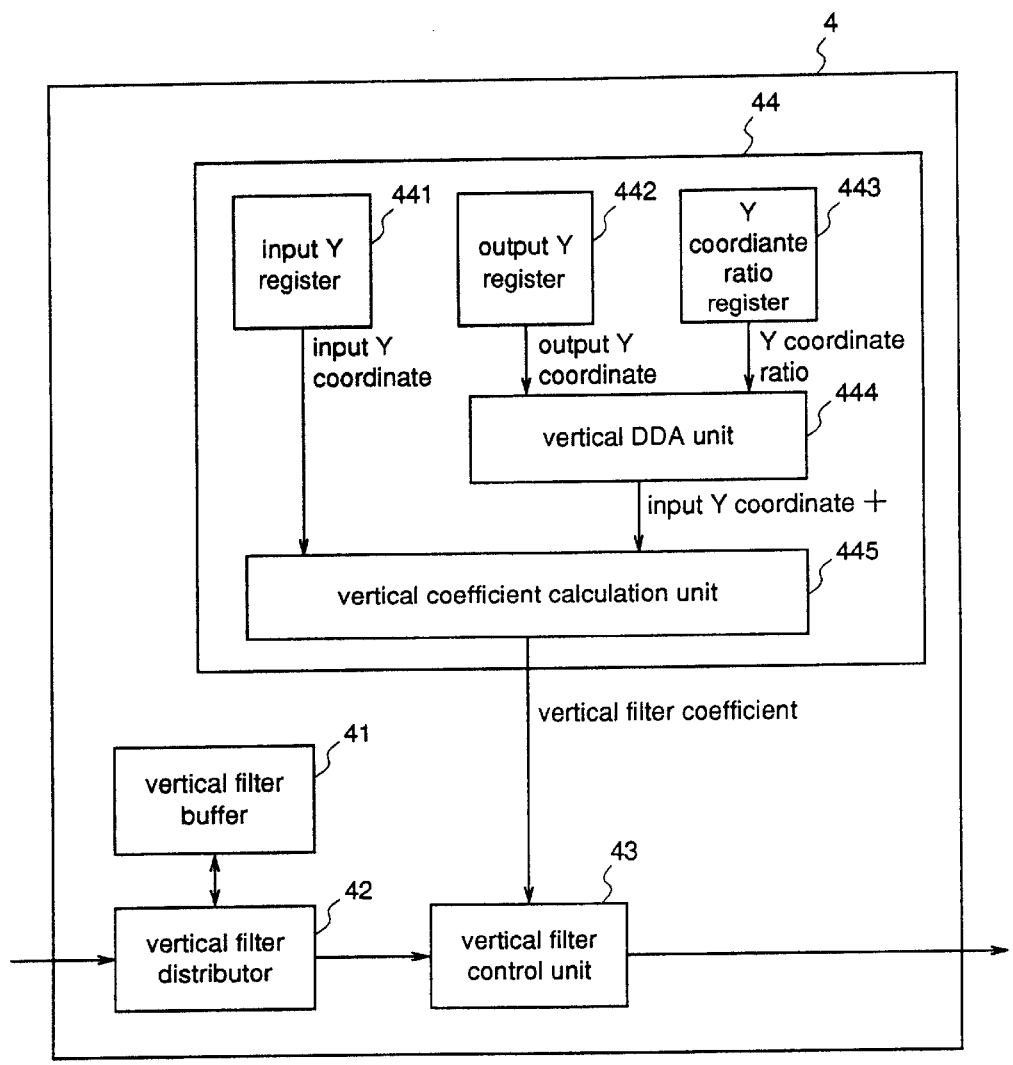
FIG. 8 is a diagram illustrating a detailed configuration of a vertical filter according to the first embodiment.
Figure 9:
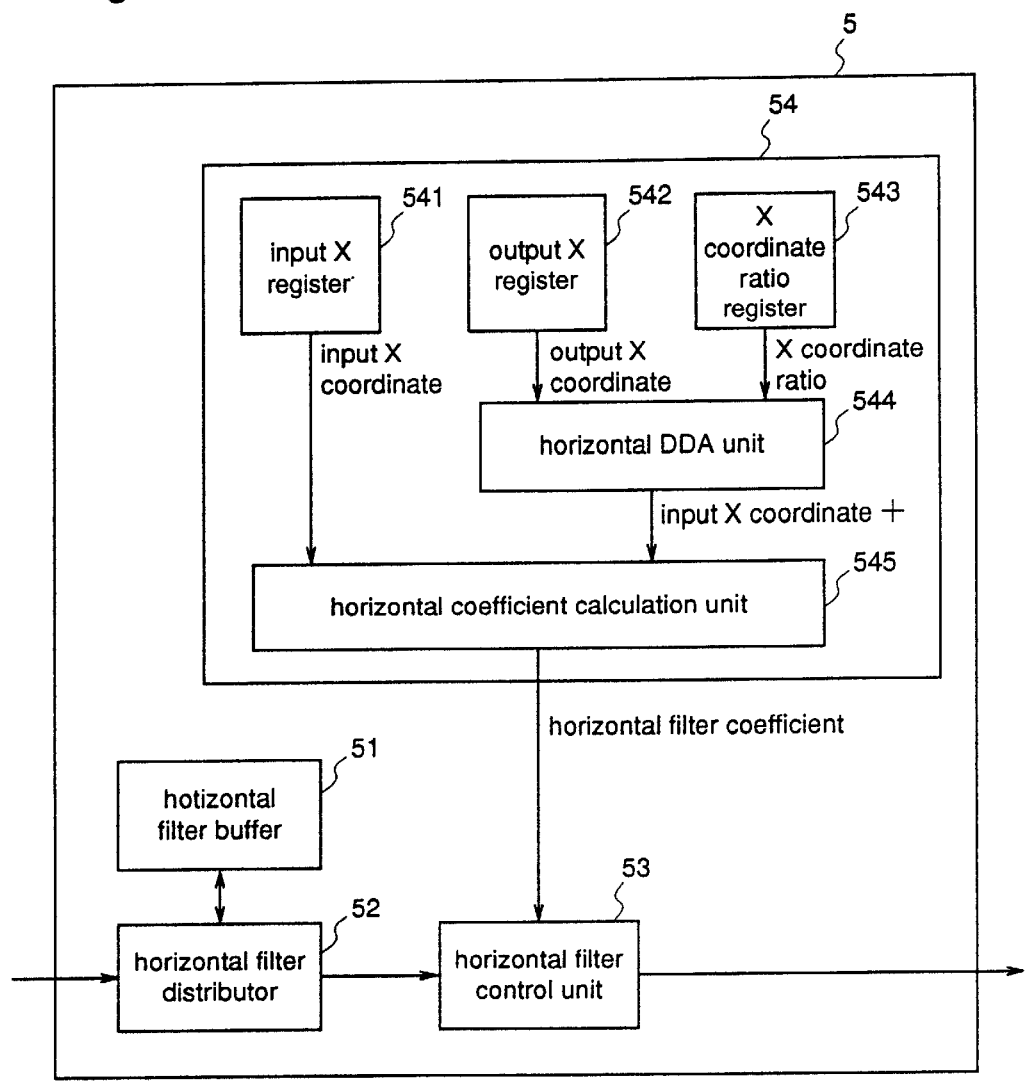
FIG. 9 is a diagram illustrating a detailed configuration of a horizontal filter according to the first embodiment.
Figure 10:
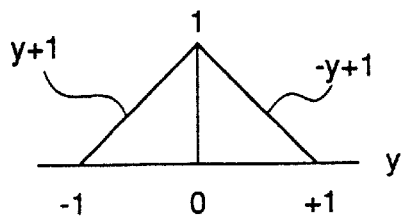
FIGS. 10(*a*) and 10(*b*) are diagrams for explaining filter coefficient during linear interpolation by the vertical filter according to the first embodiment.
Figure 10:
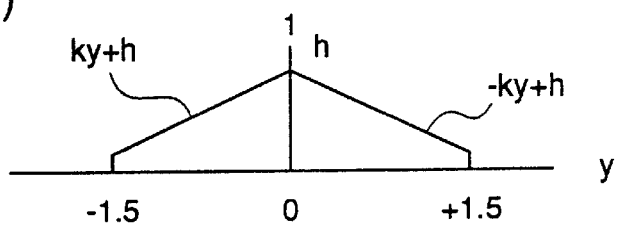
Figure 11:
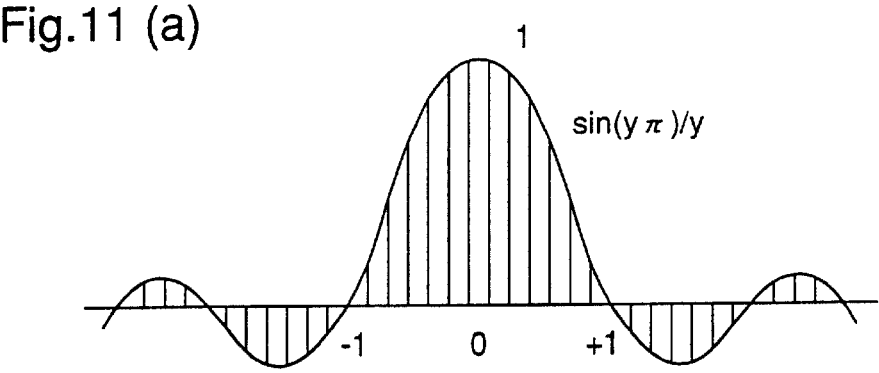
FIGS. 11(*a*) and 11(*b*) are diagrams for explaining filter coefficient during high-degree interpolation by the vertical filter according to the first embodiment.
Figure 11:
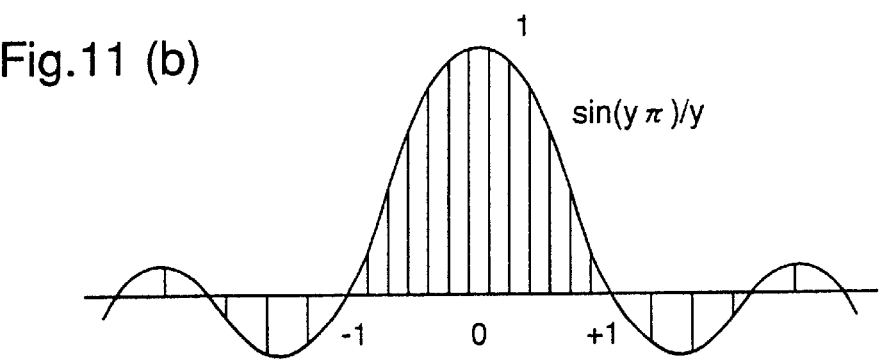

FIG. 8 is a diagram illustrating detailed configuration of the vertical filter unit 4 described in the first embodiment, and FIG. 9 is a diagram showing detailed configuration of the horizontal filter unit 5 described in the first embodiment. In FIG. 8, reference numeral 44 designates a vertical filter coefficient unit which comprises an input Y resistor 441, an output Y register 442, an Y coordinate ratio register 443, a vertical DDA unit 444, and a vertical coefficient calculation unit 445. In FIG. 9, reference numeral 54 designates a horizontal filter coefficient unit which comprises an input X register 541, an output X register 542, an X coordinate ratio resistor 543, a horizontal DDA unit 544, and a horizontal coefficient calculation unit 545. The vertical filter unit 4 and the horizontal filter unit 5 have the same configuration, and thus the vertical filter unit 4 is used as an example of the configuration.

The input Y register 441 shows a pixel position of the image data which is a process target and input to the vertical filter buffer 41, and when a scan line is changed to another line, a register value is increased by one. On the other hand, the output Y register 42 shows a pixel position of the image data output from the vertical filter unit 4. The Y coordinate ratio register 443 outputs a ratio between a vertical length of an original image in the memory unit 1 and that of an image on the display unit 8, that is, a reducing/expanding ratio. The value of this ratio can be predetermined as a fixed value. The vertical DDA unit 444 cumulatively adds the value of the Y coordinate ratio resistor 443 to the inner register at a timing when the output Y register 442 is counted, outputting the resulting value as (input Y coordinate +). By the time when scanning of the image in the memory unit 1 is started, the inner register has been cleared to 0. The vertical coefficient calculation unit 445 decides where is to be an interpolation according to the input Y coordinate output from the input Y resistor 441 and the (input Y coordinate +) output from the vertical DDA unit 444, as shown in FIG. 3(a), obtaining a coefficient for linear interpolation as shown in FIG. 3(b) to output it to the vertical filter control unit 43.

Figure 15:
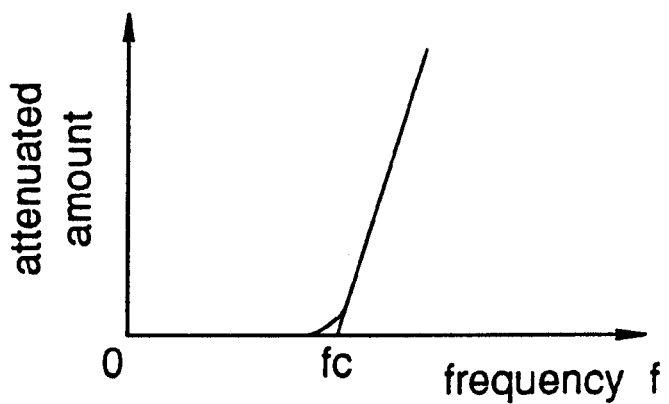
FIGS. 15(*a*) and 15(*b*) are graphs for explaining relations between the filter coefficients used in the linear interpolation by the vertical filter unit in the first embodiment and the effects of the flicker reductions.
Figure 15:
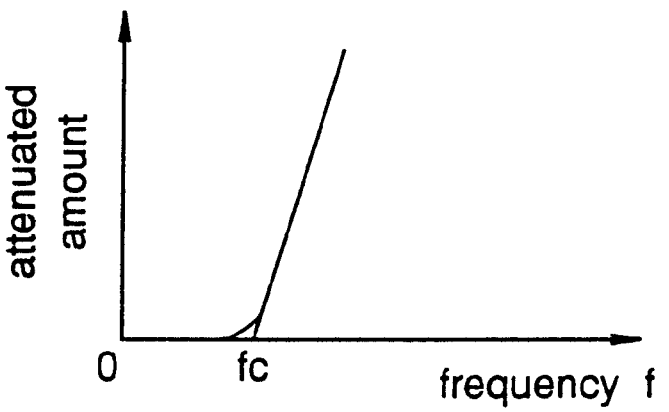

Next, a description is given of a function of reducing flickers. FIG. 10(a) shows a filter coefficient for linear interpolation described above, and FIG. 10(b) is a filter coefficient which realizes not only interpolation but flicker reduction at the same time. As shown in FIG. 10(b), a filter coefficient has a sample range within which the filter is influential and is set to ±1.5 so that not only adjacent samples but a sample next to one of the samples can be subject to the influence. This means the filter is a 3-tap interpolation filter. As flicker-reducing processing has an influence upon original samples (samples of the image data to be input) to reduce a gap in brightness between adjacent samples, applying the linear interpolation filter having the filter coefficient shown in FIG. 10(a) is impossible because it cannot have an effect on the original sample; on the other hand, the filter having the filter coefficient shown in FIG. 10(b) can give an effect on the original sample and therefore handle both flicker reducing processing and interpolating processing. FIGS. 15(a) and 15(b) are diagrams schematically illustrating the frequency characteristic of the filter having the filter coefficient shown in FIG. 10(a) and that of the filter having the filter coefficient shown in FIG. 10(b), respectively. The filter having the filter coefficient shown in FIG. 10(b) has a wider sample range within which the filter is influential, compared with that of the filter having the filter coefficient shown in FIG. 10(a). This means that the out-off frequency $f_c$ in the frequency characteristics of the filter having the filter coefficient shown in FIG. 10(b) is relatively low in comparison with the cut-off frequency $f_c$ in the frequency characteristics of the filter having the filter coefficient shown in FIG. 10(a), as shown in FIGS. 15(a) and 15(b). Therefore, by using a filter having the filter coefficient shown in FIG. 10(b), it is possible to reduce a gap in luminance between adjacent samples by cutting off high frequency coefficients, and thus the flicker reducing processing and the interpolating processing can be performed at the same time.

This filter can be expanded by increasing the tap number by one and setting a certain coefficient angle K and a certain coefficient height h ($0<h\leq1$) of the filter from the outside but the expansion requires rather complex linear calculations. The reason why flexibility is given to the angle k and the height h is that the energy of the whole image can be adjusted by filtering and that flexibility of image processing can be increased. For example, setting the angle k to 0 enables to output an image In which adjacent pixels are weighted and averaged. Moreover, as a filter coefficient of the vertical filter may be calculated only when one scan line is changed to another line, the process of obtaining the coefficient can be performed by preparing, for example, one-bit calculator and comparator and operating them for several cycles, and therefore hardware cost is not increased much.

Although the above description refers to the case of using a vertical filter only, the above system can be applied to the case of using a horizontal filter. In this case, there is no limit to the tap number due to a limitation to a buffer as in the vertical filter and therefore a higher-order coefficient is required for a horizontal coefficient calculation unit 555 for improving accuracy. However, as described in the first embodiment, a device for calculating a sin coefficient or a high-order curve equation is needed to obtain accurate filter coefficient, costing very much. In the third embodiment, as shown in FIG. 11(a), several ideal filters are sampled to be stored as tables in the vertical coefficient calculation unit 545. In this example, a six-tap filter is used as a sampling target and the filter is divided into six parts between taps and sampled. When obtaining a filter coefficient with an arbitrary sample value using the table, the simplest method is to make approximations with a sample point closest to a value included in the table. In this method, accuracy is increased with an increase in a sampling number between taps and the accuracy can be controlled by a sample number of a filter coefficient in the table. In addition, linear interpolation using not only a sample point in closest proximity to an arbitrary sample point but sample points at both sides of the arbitrary sample point further improves accuracy, and decreases the amount of sampling. Furthermore, reduced sampling can be realized by not sampling filter coefficient at even spaces as shown in FIG. 11(b) but setting a sampling density in such a way that the sampling density is high in the proximity of the position of a target pixel (the position of y=0 in FIG. 11(b)) but becomes lower according to an increase in a distance from the position of the target pixel.

While in the prior art an interpolation filter has to be provided in a stage successive to a low-pass filter for reducing flickers and interpolation, the above configuration enables both of the processes using only one low-pass filter, and is effective at reducing hardware cost.

Embodiment 4

A fourth embodiment of the present invention shows a case where an image data format conversion apparatus according to the present invention is applied in a system for transmitting and receiving television signals.

Figure 14:
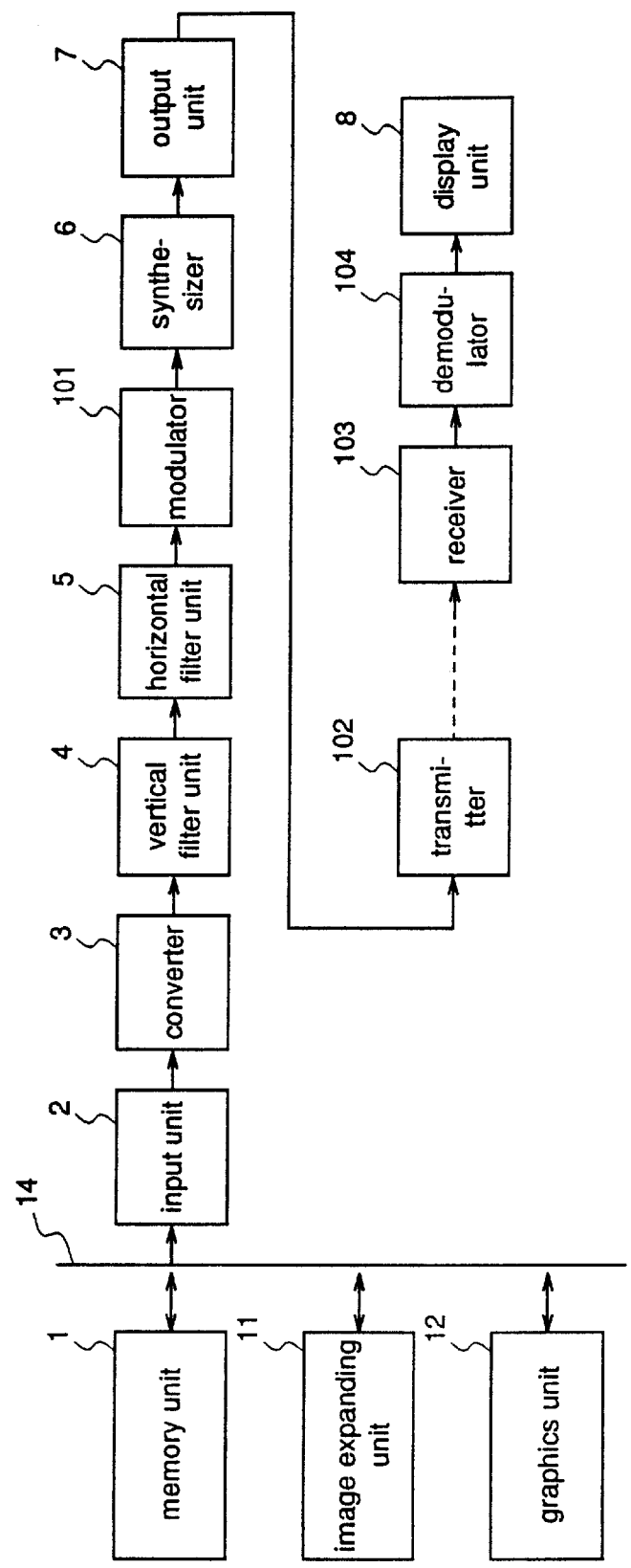
FIG. 14 is a block diagram illustrating a configuration of an image data format conversion apparatus according to a forth embodiment of the present invention.

FIG. 14 is a block diagram illustrating a configuration of an image data format conversion apparatus according to the fourth embodiment of the present invention. In FIG. 14, the same numerals shown in FIG. 1 designate the same or corresponding parts, and reference numeral 101 designates a modulator modulating carrier by the image data output from the horizontal filter unit 5 and outputting the modulated carrier to the synthesizer 6. Numeral 102 designates a transmitter transmitting the modulated and synthesized carrier output from the output unit 7. Numeral 103 designates a receiver receiving the transmitted carrier, and numeral 104 designates a demodulator for demodulating the received carrier.

In the fourth embodiment, the converter 3 is designed to convert the image data into the NTSC system format or the PAL system format if the input image data is in neither the NTSC system format nor the PAL system format, and when the image data in the NTSC system format or the PAL system format is converted into the three data elements of luminance Y, color-difference U, and color-difference V as in the case of the data in YUV format, the vertical filter unit 4 and the horizontal filter unit 5 operate in the same way as in the first embodiment. The display unit 8 comprises a television receiver. Furthermore, although in the fourth embodiment the image data output from the output unit 7 is not stored in the memory unit 1 for reuse, this may be carried out.

In the system for transmitting and receiving television signals having the above configuration, the image data formed by the image expanding unit 11 and the bitmap data formed by the graphics unit 12 are converted into the data elements of luminance Y, color-difference U, and color-difference V, respectively, and after acquiring the control signals for a television signal, the respective data are subjected to flicker reducing processing and vertically interpolated for making uniform pixel ratios if necessary in the vertical filter unit 4, and in the horizontal filter unit 5, are subjected to low-pass filtering for preventing occurrence of aliasing in the synthesizer 6 and vertically interpolated for making uniform pixel ratios if needed. Then, after convoluted on the carriers in the modulator 101, respectively, the two series of data are synthesized to be overlaid with a prescribed ratio in the synthesizer 6. Thereafter, the synthesized image data convoluted on the carriers are transmitted by the transmitter 102 through the output unit 7 to be received by the receiver 103, and after extracted by the modulator 104, the data is displayed on the television receiver 8 serving as a display unit.

Thus, the filters and buffers necessary to make formats uniform for displaying different series of original images with different attributes can be implemented by the filters and buffers used for the flicker reducing processing, thereby realizing a system for transmitting and receiving television signals with minimum hardware cost.

Although in the first to fourth embodiments the filter units are connected in such a way that the horizontal filter unit 5 is placed at the stage successive to the vertical filter unit 4, the filter units may be arranged in the reverse order. In addition, the vertical filter unit 4 and the horizontal filter unit 5 may be implemented by time-sharing a filter unit of the configuration shown in FIG. 8.

Furthermore, although in the first to third embodiments the frame of the image data is scanned by sequential scanning, interlace scanning may be performed.

Still furthermore, although any of the first to fourth embodiments treats two series of image data, three or more series of image data can be applied.

In addition, while in the second embodiment the input buffer 21, the vertical filter buffer 41, the horizontal filter buffer 51, the synthesization buffer 61, and the output buffer 71 comprise single memories, respectively, these memories can be implemented by preparing one memory and dividing it into places for the respective memories.

What is claimed is:

1. An image data format conversion apparatus comprising:
    a memory storing image data having different image attributes;
    a data reading means reading image data from the memory to output the data;
    a format converting means for detecting whether a format of the image data output from the data reading means is a predetermined format and when an image data format is not the predetermined format, converting the image data to the predetermined format to output the data and when an image data format is the predetermined format, passing the image data through without converting the data; and
    filter means for determining an attribute of the image data from said format converting means and vertically and horizontally interpolating the image data output from the format converting means by filtering operation to output the data or making the image data pass through without interpolating the data in accordance with an attribute of the image data.

2. An image data format conversion apparatus as defined in claim 1 further comprising:
    an image synthesizing means performing logic operations for the image data output from the filter, synthesizing the image data to output the image data.

3. An image data format conversion apparatus as defined in claim 1 further comprising:
    an image output means outputting the image data output from the image synthesizing means to a designated display unit.

4. An image format data conversion apparatus as defined in claim 1, wherein the predetermined format is an RGB format.

5. An image data format conversion apparatus as defined in claim 3 wherein the image output means writes the image data as an output thereof into the memory as well as the designated display.

6. An image data format conversion apparatus comprising:
    a memory storing image data;
    a data reading means reading image data from the memory to output the data;
    a format converting means converting the image data output from the data reading means to a predetermined format to output the data or making the image data pass through without converting the data;
    a filter vertically and horizontally interpolating the image data output from the format converting means by filtering operation to output the data or making the image data pass through without interpolating the data;
    an image synthesizing means performing logic operations for the image data output from the filter, synthesizing the image data to output the image data; and
    an image output means outputting the image data output from the image synthesizing means to a designated display unit
    wherein the memory stores groups of image data having different formats separately;
    the data reading means comprises an input buffer temporarily storing the groups of image data having different formats and an input control means reading image data in a designated format from the memory to write the data into the input buffer or reading image data in a designated format from the input buffer to output the data;
    the filter comprises a vertical filter and a horizontal filter which vertically or horizontally interpolate the image data output from the format converting means, respectively, so that the data can be subjected to processing almost simultaneously, said vertical filter comprising a vertical filter buffer temporarily and separately storing groups of image data having different formats; a vertical filter distributing means writing the image data output from the format converting means or the horizontal filter into the vertical filter buffer according to a designated format or reading image data from the vertical filter buffer according to a designated format to output the data; and a vertical filter control means performing convolution operation for the image data output from the vertical filter distributing means and a vertical filter coefficient prepared according to a designated format to output the result, said horizontal filter comprising a horizontal filter buffer temporarily and separately storing groups of image data having different formats; a horizontal filter distributing means writing image data output from the vertical filter or the format converting means into the horizontal filter buffer according to a designated format or reading image data from the horizontal filter buffer according to a designated format to output the data; and a horizontal filter control means performing convolution operation for the image data output from the horizontal filter distributing means and a horizontal filter coefficient prepared according to a designated format;

the image synthesizing means comprises a synthesization buffer temporarily and separately storing groups of image data having different formats, a synthesization distributing means writing the image data output from the filter into the synthesization buffer according to a designated format or reading image data from the synthesization buffer according to a designated format to output the data, and a synthesization control means performing logical operation for the image data in a designated format output from the synthesization distributing means; and the image output means comprises an output buffer temporarily storing groups of image data having different formats and an output control means writing the image data output from the image synthesizing means into the output buffer according to a designated format or reading image data from the output buffer according to a designated format to output the data.

7. An image data format conversion apparatus comprising:

a memory storing image data;

a data reading means reading image data from the memory to output the data;

a format converting means converting the image data output from the data reading means to a predetermined format to output the data or making the image data pass through without converting the data;

a filter vertically and horizontally interpolating the image data output from the format converting means by filtering operation to output the data or making the image data pass through without interpolating the data;

an image synthesizing means performing logic operations for the image data output from the filter, synthesizing the image data to output the image data; and an image output means outputting the image data output from the image synthesizing means to a designated display unit;

wherein the memory stores groups of image data having different formats separately;

the data reading means comprises an input buffer temporarily storing the groups of image data having different formats and an input control means reading image data in a designated format from the memory to write the data into the input buffer or reading image data in a designated format from the input buffer to output the data;

the filter comprises a vertical filter and a horizontal filter which vertically or horizontally interpolate the image data output from the format converting means, respectively, so that the data can be subjected to processing almost simultaneously, said vertical filter comprising a vertical filter buffer temporarily and separately storing groups of image data having different formats; a vertical filter distributing means writing the image data output from the format converting means or the horizontal filter into the vertical filter buffer according to a designated format or reading image data from the vertical filter buffer according to a designated format to output the data; and a vertical filter control means performing convolution operation for the image data output from the vertical filter distributing means and a vertical filter coefficient prepared according to a designated format to output the result, said horizontal filter comprising a horizontal filter buffer temporarily and separately storing groups of image data having different formats; a horizontal filter distributing means writing image data output from the vertical filter or the format converting means into the horizontal filter buffer according to a designated format or reading image data from the horizontal filter buffer according to a designated format to output the data; and a horizontal filter control means performing convolution operation for the image data output from the horizontal filter distributing means and a horizontal filter coefficient prepared according to a designated format;

the image synthesizing means comprises a synthesization buffer temporarily and separately storing groups of image data having different formats, a synthesization distributing means writing the image data output from the filter into the synthesization buffer according to a designated format or reading image data from the synthesization buffer according to a designated format to output the data, and a synthesization control means performing logical operation for the image data in a designated format output from the synthesization distributing means; and the image output means comprises an output buffer temporarily storing groups of image data having different formats and an output control means writing the image data output from the image synthesizing means into the output buffer according to a designated format or reading image data from the output buffer according to a designated format to output the data;

wherein the input control means reads image data from the memory for writing the data into the input buffer, the image data having a format corresponding to that of the image data having the smallest data storage unit number in one of groups of image data stored separately according to formats in the input buffer, or reading image data from the input buffer according to a designated format to output the data;

the format converting means requests image data in the data reading means according to a designated format or converts the image data output from the data reading means to a predetermined format according to a designated format;

the vertical filter distributing means requests image data in the format converting means or the horizontal filter, the image data having a format corresponding to that of the image data having the smallest data storage unit number in one of groups of image data stored separately according to formats in the vertical filter buffer or reads image data from the vertical filter buffer according to a designated format to output the data;

the horizontal filter distributing means requests image data in the vertical filter or the format converting means, the image data having a format corresponding to that of the image data having the smallest data storage unit number in one of groups of image data stored separately according to formats in the horizontal filter buffer or reads image data from the horizontal filter buffer according to a designated format to output the data;

the synthesization distributing means requests image data in the filter, the image data having a format corresponding to that of the image data having the smallest data storage unit number in one of groups of image data stored separately according to formats in the synthesization buffer or reads image data from the synthesization buffer according to a designated format to output the data; and the output control means requests image data in the image synthesizing means, the image data having a format corresponding to that of the image data having the smallest data storage unit number in one of groups of image data stored separately according to formats in the output buffer or reads image data from the output buffer according to a designated format to output the data.

8. An image data format conversion apparatus comprising:

a memory storing image data;

a data reading means reading image data from the memory to output the data;

a format converting means converting the image data output from the data reading means to a predetermined format to output the data or making the image data pass through without converting the data;

a filter vertically and horizontally interpolating the image data output from the format converting means by filtering operation to output the data or making the image data pass through without interpolating the data;

an image synthesizing means performing logic operations for the image data output from the filter, synthesizing the image data to output the image data; and an image output means outputting the image data output from the image synthesizing means to a designated display unit;

wherein the memory stores groups of image data having different formats separately;

the data reading means comprises an input buffer temporarily storing the groups of image data having different formats and an input control means reading image data in a designated format from the memory to write the data into the input buffer or reading image data in a designated format from the input buffer to output the data;

the filter comprises a vertical filter and a horizontal filter which vertically or horizontally interpolate the image data output from the format converting means, respectively, so that the data can be subjected to processing almost simultaneously, said vertical filter comprising a vertical filter buffer temporarily and separately storing groups of image data having different formats; a vertical filter distributing means writing the image data output from the format converting means or the horizontal filter into the vertical filter buffer according to a designated format or reading image data from the vertical filter buffer according to a designated format to output the data; and a vertical filter control means performing convolution operation for the image data output from the vertical filter distributing means and a vertical filter coefficient prepared according to a designated format to output the result, said horizontal filter comprising a horizontal filter buffer temporarily and separately storing groups of image data having different formats; a horizontal filter distributing means writing image data output from the vertical filter or the format converting means into the horizontal filter buffer according to a designated format or reading image data from the horizontal filter buffer according to a designated format to output the data; and a horizontal filter control means performing convolution operation for the image data output from the horizontal filter distributing means and a horizontal filter coefficient prepared according to a designated format;

the image synthesizing means comprises a synthesization buffer temporarily and separately storing groups of image data having different formats, a synthesization distributing means writing the image data output from the filter into the synthesization buffer according to a designated format or reading image data from the synthesization buffer according to a designated format to output the data, and a synthesization control means performing logical operation for the image data in a designated format output from the synthesization distributing means;

the image output means comprises an output buffer temporarily storing groups of image data having different formats and an output control means writing the image data output from the image synthesizing means into the output buffer according to a designated format or reading image data from the output buffer according to a designated format to output the data; the vertical filter comprises a vertical filter coefficient calculating means comprising an input Y register for detecting a point by counting pixel by pixel from an original point in the vertical direction to store the point as an input Y coordinate and outputting a value thereof, the original point being designated to correspond to image data stored in the memory;

an output Y register for detecting a point by counting pixel by pixel from an original point in the vertical direction to store the point as an output Y coordinate and outputting a value thereof, the original point being designated to correspond to image data output from the image output means;

an Y coordinate ratio register for storing a predetermined ratio between the input Y coordinate and the output Y coordinate to output the ratio;

a vertical DDA means for obtaining a converted input Y coordinate to which a reducing/expanding ratio is added, using an output of the output Y coordinate ratio register and an output of the output Y register to output the coordinate; and a vertical filter coefficient calculating means for obtaining a vertical filter coefficient which is to be input to the vertical filter control means using an output of the vertical DDA means and an output of the input Y register, wherein the horizontal filter comprises:

an input X register detecting a point by counting pixel by pixel from an original point in the horizontal direction to store the point as an input X coordinate and outputting a value thereof, the original point being designated to correspond to image data stored in the memory;

an output X register for detecting a point by counting pixel by pixel from an original point in the horizontal direction to store the point as an output X coordinate and outputting a value thereof, the original point being designated to correspond to image data output from the image output means;

an X coordinate ratio register for storing a predetermined ratio between the input X coordinate and the output X coordinate to output the ratio;

a horizontal DDA means for obtaining a converted input X coordinate to which a reducing/expanding ratio is added, using an output of the X coordinate ratio register and an output of the output X register to output the coordinate; and a horizontal filter coefficient calculating means for obtaining a horizontal filter coefficient which is to be input to the horizontal filter control means using an output of the horizontal DDA means and an output of the input X register.

9. An image data format conversion apparatus comprising:

a memory storing image data;

a data reading means reading image data from the memory to output the data;

a format converting means converting the image data output from the data reading means to a predetermined format to output the data or making the image data pass through without converting the data;

a filter vertically and horizontally interpolating the image data output from the format converting means by filtering operation to output the data or making the image data pass through without interpolating the data;

an image synthesizing means performing logic operations for the image data output from the filter, synthesizing the image data to output the image data; and an image output means outputting the image data output from the image synthesizing means to a designated display unit;

wherein the memory stores groups of image data having different formats separately;

the data reading means comprises an input buffer temporarily storing the groups of image data having different formats and an input control means reading image data in a designated format from the memory to write the data into the input buffer or reading image data in a designated format from the input buffer to output the data;

the filter comprises a vertical filter and a horizontal filter which vertically or horizontally interpolate the image data output from the format converting means, respectively, so that the data can be subjected to processing almost simultaneously, said vertical filter comprising a vertical filter buffer temporarily and separately storing groups of image data having different formats; a vertical filter distributing means writing the image data output from the format converting means or the horizontal filter into the vertical filter buffer according to a designated format or reading image data from the vertical filter buffer according to a designated format to output the data; and a vertical filter control means performing convolution operation for the image data output from the vertical filter distributing means and a vertical filter coefficient prepared according to a designated format to output the result, said horizontal filter comprising a horizontal filter buffer temporarily and separately storing groups of image data having different formats; a horizontal filter distributing means writing image data output from the vertical filter or the format converting means into the horizontal filter buffer according to a designated format or reading image data from the horizontal filter buffer according to a designated format to output the data; and a horizontal filter control means performing convolution operation for the image data output from the horizontal filter distributing means and a horizontal filter coefficient prepared according to a designated format;

the image synthesizing means comprises a synthesization buffer temporarily and separately storing groups of image data having different formats, a synthesization distributing means writing the image data output from the filter into the synthesization buffer according to a designated format or reading image data from the synthesization buffer according to a designated format to output the data, and a synthesization control means performing logical operation for the image data in a designated format output from the synthesization distributing means;

the image output means comprises an output buffer temporarily storing groups of image data having different formats and an output control means writing the image data output from the image synthesizing means into the output buffer according to a designated format or reading image data from the output buffer according to a designated format to output the data wherein the vertical filter comprises a vertical filter coefficient calculating means comprising an input Y register for detecting a point by counting pixel by pixel from an original point in the vertical direction to store the point as an input Y coordinate and outputting a value thereof, the original point being designated to correspond to image data stored in the memory;

an output Y register for detecting a point by counting pixel by pixel from an original point in the vertical direction to store the point as an output Y coordinate and outputting a value thereof, the original point being designated to correspond to image data output from the image output means;

an Y coordinate ratio register for storing a predetermined ratio between the input Y coordinate and the output Y coordinate to output the ratio;

a vertical DDA means for obtaining a converted input Y coordinate to which a reducing/expanding ratio is added, using an output of the output Y coordinate ratio register and an output of the output Y register to output the coordinate; and a vertical filter coefficient calculating means for obtaining a vertical filter coefficient which is to be input to the vertical filter control means using an output of the vertical DDA means and an output of the input Y register, wherein the horizontal filter comprises:

an input X register detecting a point by counting pixel by pixel from an original point in the horizontal direction to store the point as an input X coordinate and outputting a value thereof, the original point being designated to correspond to image data stored in the memory;

an output X register for detecting a point by counting pixel by pixel from an original point in the horizontal direction to store the point as an output X coordinate and outputting a value thereof, the original point being designated to correspond to image data output from the image output means;

an X coordinate ratio register for storing a predetermined ratio between the input X coordinate and the output X coordinate to output the ratio;

a horizontal DDA means for obtaining a converted input X coordinate to which a reducing/expanding ratio is added, using an output of the X coordinate ratio register and an output of the output X register to output the coordinate; and a horizontal filter coefficient calculating means for obtaining a horizontal filter coefficient which is to be input to the horizontal filter control means using an output of the horizontal DDA means and an output of the input X register wherein the vertical filter coefficient calculating means obtains a vertical filter coefficient with respect to image data output from the vertical distributing means using the converted input Y coordinate output from the vertical DDA means and an input integral Y coordinate which is an integral value in closest proximity to the converted input Y coordinate, the vertical filter coefficient being referred to with the input integral Y coordinate as a center thereof.

10. An image data format conversion apparatus comprising:

a memory storing image data;

a data reading means reading image data from the memory to output the data;

a format converting means converting the image data output from the data reading means to a predetermined format to output the data or making the image data pass through without converting the data;

a filter vertically and horizontally interpolating the image data output from the format converting means by filtering operation to output the data or making the image data pass through without interpolating the data;

an image synthesizing means performing logic operations for the image data output from the filter, synthesizing the image data to output the image data; and an image output means outputting the image data output from the image synthesizing means to a designated display unit;

wherein the memory stores groups of image data having different formats separately;

the data reading means comprises an input buffer temporarily storing the groups of image data having different formats and an input control means reading image data in a designated format from the memory to write the data into the input buffer or reading image data in a designated format from the input buffer to output the data;

the filter comprises a vertical filter and a horizontal filter which vertically or horizontally interpolate the image data output from the format converting means, respectively, so that the data can be subjected to processing almost simultaneously, said vertical filter comprising a vertical filter buffer temporarily and separately storing groups of image data having different formats; a vertical filter distributing means writing the image data output from the format converting means or the horizontal filter into the vertical filter buffer according to a designated format or reading image data from the vertical filter buffer according to a designated format to output the data; and a vertical filter control means performing convolution operation for the image data output from the vertical filter distributing means and a vertical filter coefficient prepared according to a designated format to output the result, said horizontal filter comprising a horizontal filter buffer temporarily and separately storing groups of image data having different formats; a horizontal filter distributing means writing image data output from the vertical filter or the format converting means into the horizontal filter buffer according to a designated format or reading image data from the horizontal filter buffer according to a designated format to output the data; and a horizontal filter control means performing convolution operation for the image data output from the horizontal filter distributing means and a horizontal filter coefficient prepared according to a designated format;

the image synthesizing means comprises a synthesization buffer temporarily and separately storing groups of image data having different formats, a synthesization distributing means writing the image data output from the filter into the synthesization buffer according to a designated format or reading image data from the synthesization buffer according to a designated format to output the data, and a synthesization control means performing logical operation for the image data in a designated format output from the synthesization distributing means;

the image output means comprises an output buffer temporarily storing groups of image data having different formats and an output control means writing the image data output from the image synthesizing means into the output buffer according to a designated format or reading image data from the output buffer according to a designated format to output the data wherein the vertical filter comprises a vertical filter coefficient calculating means comprising an input Y register for detecting a point by counting pixel by pixel from an original point in the vertical direction to store the point as an input Y coordinate and outputting a value thereof, the original point being designated to correspond to image data stored in the memory;

an output Y register for detecting a point by counting pixel by pixel from an original point in the vertical direction to store the point as an output Y coordinate and outputting a value thereof, the original point being designated to correspond to image data output from the image output means;

an Y coordinate ratio register for storing a predetermined ratio between the input Y coordinate and the output Y coordinate to output the ratio;

a vertical DDA means for obtaining a converted input Y coordinate to which a reducing/expanding ratio is added, using an output of the output Y coordinate ratio register and an output of the output Y register to output the coordinate; and a vertical filter coefficient calculating means for obtaining a vertical filter coefficient which is to be input to the vertical filter control means using an output of the vertical DDA means and an output of the input Y register;

wherein the horizontal filter comprises can input X register detecting a point by counting pixel by pixel from an original point in the horizontal direction to store the point as an input X coordinate and outputting a value thereof, the original point being designated to correspond to image data stored in the memory;

an output X register for detecting a point by counting pixel by pixel from an original point in the horizontal direction to store the point as an output X coordinate and outputting a value thereof, the original point being designated to correspond to image data output from the image output means;

an X coordinate ratio register for storing a predetermined ratio between the input X coordinate and the output X coordinate to output the ratio;

a horizontal DDA means for obtaining a converted input X coordinate to which a reducing/expanding ratio is added, using an output of the X coordinate ratio register and an output of the output X register to output the coordinate; and a horizontal filter coefficient calculating means for obtaining a horizontal filter coefficient which is to be input to the horizontal filter control means using an output of the horizontal DDA means and an output of the input X register wherein the vertical filter coefficient calculating means obtains a vertical filter coefficient with respect to image data output from the vertical distributing means using the converted input Y coordinate output from the vertical DDA means and an input integral Y coordinate which is an integral value in closest proximity to the converted input Y coordinate, the vertical filter coefficient being referred to with the input integral Y coordinate as a center thereof and wherein the vertical filter coefficient calculating means comprises a vertical interpolating means performing, using the input integral Y coordinate as an original point and a vertical filter coefficient of the coordinate as h (0<h23 1), interpolation with a straight line having an angle k when an input coordinate is located under the original point while performing interpolation with a straight line having an angle −k when an input point is located above the original point, and outputting the interpolated result as 0 when the result as a negative value; and a vertical filter tap means inputting coordinates corresponding to a tap number of a filter to the vertical interpolating means to obtain a vertical filter coefficient corresponding to the image data output from the vertical distributing means and output the coefficient, the filter being designated with a converted input Y coordinate output from the vertical DDA means as a center thereof.

11. An image data format conversion apparatus comprising:

a memory storing image data;

a data reading means reading image data from the memory to output the data;

a format converting means converting the image data output from the data reading means to a predetermined format to output the data or making the image data pass through without converting the data;

a filter vertically and horizontally interpolating the image data output from the format converting means by filtering operation to output the data or making the image data pass through without interpolating the data;

an image synthesizing means performing logic operations for the image data output from the filter, synthesizing the image data to output the image data; and an image output means outputting the image data output from the image synthesizing means to a designated display unit;

wherein the memory stores groups of image data having different formats separately;

the data reading means comprises an input buffer temporarily storing the groups of image data having different formats and an input control means reading image data in a designated format from the memory to write the data into the input buffer or reading image data in a designated format from the input buffer to output the data;

the filter comprises a vertical filter and a horizontal filter which vertically or horizontally interpolate the image data output from the format converting means, respectively, so that the data can be subjected to processing almost simultaneously, said vertical filter comprising a vertical filter buffer temporarily and separately storing groups of image data having different formats; a vertical filter distributing means writing the image data output from the format converting means or the horizontal filter into the vertical filter buffer according to a designated format or reading image data from the vertical filter buffer according to a designated format to output the data; and a vertical filter control means performing convolution operation for the image data output from the vertical filter distributing means and a vertical filter coefficient prepared according to a designated format to output the result, said horizontal filter comprising a horizontal filter buffer temporarily and separately storing groups of image data having different formats; a horizontal filter distributing means writing image data output from the vertical filter or the format converting means into the horizontal filter buffer according to a designated format or reading image data from the horizontal filter buffer according to a designated format to output the data; and a horizontal filter control means performing convolution operation for the image data output from the horizontal filter distributing means and a horizontal filter coefficient prepared according to a designated format;

the image synthesizing means comprises a synthesization buffer temporarily and separately storing groups of image data having different formats, a synthesization distributing means writing the image data output from the filter into the synthesization buffer according to a designated format or reading image data from the synthesization buffer according to a designated format to output the data, and a synthesization control means performing logical operation for the image data in a designated format output from the synthesization distributing means;

the image output means comprises an output buffer temporarily storing groups of image data having different formats and an output control means writing the image data output from the image synthesizing means into the output buffer according to a designated format or reading image data from the output buffer according to a designated format to output the data wherein the vertical filter comprises a vertical filter coefficient calculating means comprising an input Y register for detecting a point by counting pixel by pixel from an original point in the vertical direction to store the point as an input Y coordinate and outputting a value thereof, the original point being designated to correspond to image data stored in the memory;

an output Y register for detecting a point by counting pixel by pixel from an original point in the vertical direction to store the point as an output Y coordinate and outputting a value thereof, the original point being designated to correspond to image data output from the image output means;

an Y coordinate ratio register for storing a predetermined ratio between the input Y coordinate and the output Y coordinate to output the ratio;

a vertical DDA means for obtaining a converted input Y coordinate to which a reducing/expanding ratio is added, using an output of the output Y coordinate ratio register and an output of the output Y register to output the coordinate; and a vertical filter coefficient calculating means for obtaining a vertical filter coefficient which is to be input to the vertical filter control means using an output of the vertical DDA means and an output of the input Y register;

wherein the horizontal filter comprises:
  an input X register detecting a point by counting pixel by pixel from an original point in the horizontal direction to store the point as an input X coordinate and outputting a value thereof, the original point being designated to correspond to image data stored in the memory;
  an output X register for detecting a point by counting pixel by pixel from an original point in the horizontal direction to store the point as an output X coordinate and outputting a value thereof, the original point being designated to correspond to image data output from the image output means;
  an X coordinate ratio register for storing a predetermined ratio between the input X coordinate and the output X coordinate to output the ratio;
  a horizontal DDA means for obtaining a converted input X coordinate to which a reducing/expanding ratio is added, using an output of the X coordinate ratio register and an output of the output X register to output the coordinate; and
  a horizontal filter coefficient calculating means for obtaining a horizontal filter coefficient which is to be input to the horizontal filter control means using an output of the horizontal DDA means and an output of the input X register wherein the horizontal filter coefficient calculating means obtains a horizontal filter coefficient for the image data output from the horizontal filter distributing means, from a converted input X coordinate output from the horizontal DDA means and an input integral X coordinate which is an integral value in closest proximity to the converted input X coordinate, the horizontal filter coefficient being referred to with the input integral X coordinate as a center thereof.

12. An image data format conversion apparatus comprising:
  a memory storing image data;
  a data reading means reading image data from the memory to output the data;
  a format converting means converting the image data output from the data reading means to a predetermined format to output the data or making the image data pass through without converting the data;
  a filter vertically and horizontally interpolating the image data output from the format converting means by filtering operation to output the data or making the image data pass through without interpolating the data;
  an image synthesizing means performing logic operations for the image data output from the filter, synthesizing the image data to output the image data; and
  an image output means outputting the image data output from the image synthesizing means to a designated display unit;
  wherein the memory stores groups of image data having different formats separately;
  the data reading means comprises an input buffer temporarily storing the groups of image data having different formats and an input control means reading image data in a designated format from the memory to write the data into the input buffer or reading image data in a designated format from the input buffer to output the data;
  the filter comprises a vertical filter and a horizontal filter which vertically or horizontally interpolate the image data output from the format converting means, respectively, so that the data can be subjected to processing almost simultaneously, said vertical filter comprising a vertical filter buffer temporarily and separately storing groups of image data having different formats; a vertical filter distributing means writing the image data output from the format converting means or the horizontal filter into the vertical filter buffer according to a designated format or reading image data from the vertical filter buffer according to a designated format to output the data; and a vertical filter control means performing convolution operation for the image data output from the vertical filter distributing means and a vertical filter coefficient prepared according to a designated format to output the result, said horizontal filter comprising a horizontal filter buffer temporarily and separately storing groups of image data having different formats; a horizontal filter distributing means writing image data output from the vertical filter or the format converting means into the horizontal filter buffer according to a designated format or reading image data from the horizontal filter buffer according to a designated format to output the data; and a horizontal filter control means performing convolution operation for the image data output from the horizontal filter distributing means and a horizontal filter coefficient prepared according to a designated format;
  the image synthesizing means comprises a synthesization buffer temporarily and separately storing groups of image data having different formats, a synthesization distributing means writing the image data output from the filter into the synthesization buffer according to a designated format or reading image data from the synthesization buffer according to a designated format to output the data, and a synthesization control means performing logical operation for the image data in a designated format output from the synthesization distributing means;
  the image output means comprises an output buffer temporarily storing groups of image data having different formats and an output control means writing the image data output from the image synthesizing means into the output buffer according to a designated format or reading image data from the output buffer according to a designated format to output the data wherein the vertical filter comprises a vertical filter coefficient calculating means comprising an input Y register for detecting a point by counting pixel by pixel from an original point in the vertical direction to store the point as an input Y coordinate and outputting a value thereof, the original point being designated to correspond to image data stored in the memory;
  an output Y register for detecting a point by counting pixel by pixel from an original point in the vertical direction to store the point as an output Y coordinate and outputting a value thereof, the original point being designated to correspond to image data output from the image output means;
  an Y coordinate ratio register for storing a predetermined ratio between the input Y coordinate and the output Y coordinate to output the ratio;
  a vertical DDA means for obtaining a converted input Y coordinate to which a reducing/expanding ratio is added, using an output of the output Y coordinate ratio register and an output of the output Y register to output the coordinate; and
  a vertical filter coefficient calculating means for obtaining a vertical filter coefficient which is to be input to the vertical filter control means using an output of the vertical DDA means and an output of the input Y register;

wherein the horizontal filter comprises an input X register detecting a point by counting pixel by pixel from an original point in the horizontal direction to store the point as an input X coordinate and outputting a value thereof, the original point being designated to correspond to image data stored in the memory;

an output X register for detecting a point by counting pixel by pixel from an original point in the horizontal direction to store the point as an output X coordinate and outputting a value thereof, the original point being designated to correspond to image data output from the image output means;

an X coordinate ratio register for storing a predetermined ratio between the input X coordinate and the output X coordinate to output the ratio;

a horizontal DDA means for obtaining a converted input X coordinate to which a reducing/expanding ratio is added, using an output of the X coordinate ratio register and an output of the output X register to output the coordinate; and a horizontal filter coefficient calculating means for obtaining a horizontal filter coefficient which is to be input to the horizontal filter control means using an output of the horizontal DDA means and an output of the input X register wherein the horizontal filter coefficient calculating means obtains a horizontal filter coefficient for the image data output from the horizontal filter distributing means, from a converted input X coordinate output from the horizontal DDA means and an input integral X coordinate which is an integral value in closest proximity to the converted input X coordinate, the horizontal filter coefficient being referred to with the input integral X coordinate as a center thereof wherein the horizontal filter coefficient calculating means comprises a horizontal interpolating means storing a horizontal filter coefficient having a sampling ratio an integer times higher than that of the image data stored in the memory and outputting an horizontal filter coefficient in closest proximity to an input coordinate with a horizontal filter coefficient obtained when the input integral X coordinate is an original point as a center of the horizontal filter coefficient; and a horizontal filter tap means inputting coordinates corresponding to a tap number of a filter into the horizontal interpolating means, the filter being designated with a converted input X coordinate output from the horizontal DDA means as a center thereof, and obtaining a horizontal filter coefficient for the image data output from the horizontal filter distributing means to output the coefficient.

\* \* \* \* \*